(12) United States Patent
Seimears

(10) Patent No.: US 11,739,870 B2
(45) Date of Patent: Aug. 29, 2023

(54) SPRING CLAMP WITH INSTALLATION AND REMOVAL CAPABILITY

(71) Applicant: Jerry Seimears, Renton, WA (US)

(72) Inventor: Jerry Seimears, Renton, WA (US)

(*) Notice: Subject to any disclaimer, the term of this patent is extended or adjusted under 35 U.S.C. 154(b) by 393 days.

(21) Appl. No.: 16/863,146

(22) Filed: Apr. 30, 2020

(65) Prior Publication Data
US 2020/0347972 A1   Nov. 5, 2020

Related U.S. Application Data

(60) Provisional application No. 62/843,320, filed on May 3, 2019.

(51) Int. Cl.
*F16L 33/06* (2006.01)

(52) U.S. Cl.
CPC .................................. *F16L 33/06* (2013.01)

(58) Field of Classification Search
CPC . F16L 33/06; F16L 33/03; F16L 33/04; B25B 7/02; B25B 25/005; B25B 7/22
See application file for complete search history.

(56) References Cited

U.S. PATENT DOCUMENTS

| | | | | |
|---|---|---|---|---|
| 1,187,430 A | * | 6/1916 | Kenly | F16L 33/04 24/275 |
| 1,275,091 A | * | 8/1918 | Richardson | F16L 33/04 24/283 |
| 1,317,326 A | * | 9/1919 | Sherman | F16L 33/04 24/283 |
| 1,778,504 A | * | 10/1930 | Malleville | F16L 33/04 24/280 |
| 2,349,809 A | * | 5/1944 | Black | F16L 33/04 24/283 |
| 2,622,290 A | * | 12/1952 | Schukraft | F16L 33/04 24/280 |
| 2,910,899 A | * | 11/1959 | Barnes | F16L 33/03 269/251 |
| 2,945,277 A | * | 7/1960 | Wiora | F16L 33/04 D8/396 |

(Continued)

FOREIGN PATENT DOCUMENTS

| EP | 0157517 A1 | 3/1985 |
|---|---|---|
| FR | 648040 | 4/1928 |

(Continued)

OTHER PUBLICATIONS

International Search Report dated Aug. 3, 2020, for PCT/US20/30676, filed Apr. 30, 2020.

(Continued)

*Primary Examiner* — David Bochna

(57) ABSTRACT

A spring clamp with integrated installation and removal capability allows a user to install or remove the spring clamp safely using common shop tools or by hand. The spring clamp includes two tangs with a fastener extending between them. The fastener may be used to draw the tangs together or apart, to thereby open or close the spring clamp, and to safely change the potential energy of the spring clamp. The user may turn the fastener or a nut on the fastener using common shop tools or by hand to expand the spring clamp so that it can be slipped over a hose and to allow the spring clamp to tighten around the hose.

15 Claims, 26 Drawing Sheets

(56) References Cited

U.S. PATENT DOCUMENTS

| | | | | |
|---|---|---|---|---|
| 3,052,944 | A | * | 9/1962 | Kallel .................... F16L 33/04 D8/356 |
| 3,131,444 | A | * | 5/1964 | Manning ................ F16L 33/03 D8/396 |
| 3,722,041 | A | * | 3/1973 | Munse .................... F16L 33/04 24/283 |
| 3,939,535 | A | * | 2/1976 | Matsuura ................ F16L 33/04 24/283 |
| 4,489,464 | A | * | 12/1984 | Massari ................. F16L 33/03 24/20 LS |
| 4,958,419 | A | * | 9/1990 | Heckethorn ............ F16L 33/04 24/283 |
| 5,050,275 | A | * | 9/1991 | Schroer .................. F16L 33/03 24/283 |
| 2006/0186668 | A1 | | 8/2006 | Sakazaki et al. |

FOREIGN PATENT DOCUMENTS

| | | |
|---|---|---|
| GB | 148299 | 7/1920 |
| GB | 439844 A | 1/1935 |
| WO | 2011/000509 A1 | 1/2011 |

OTHER PUBLICATIONS

Seimears, J., "Introduction of Next Generation Hose Clamp," Nov. 10, 2019 [online] retrieved from URL <https://www.youtube.com/watch?v=g-irqesR59s>.

Written Opinion dated Aug. 3, 2020, for PCT/US20/30676, filed Apr. 30, 2020.

\* cited by examiner

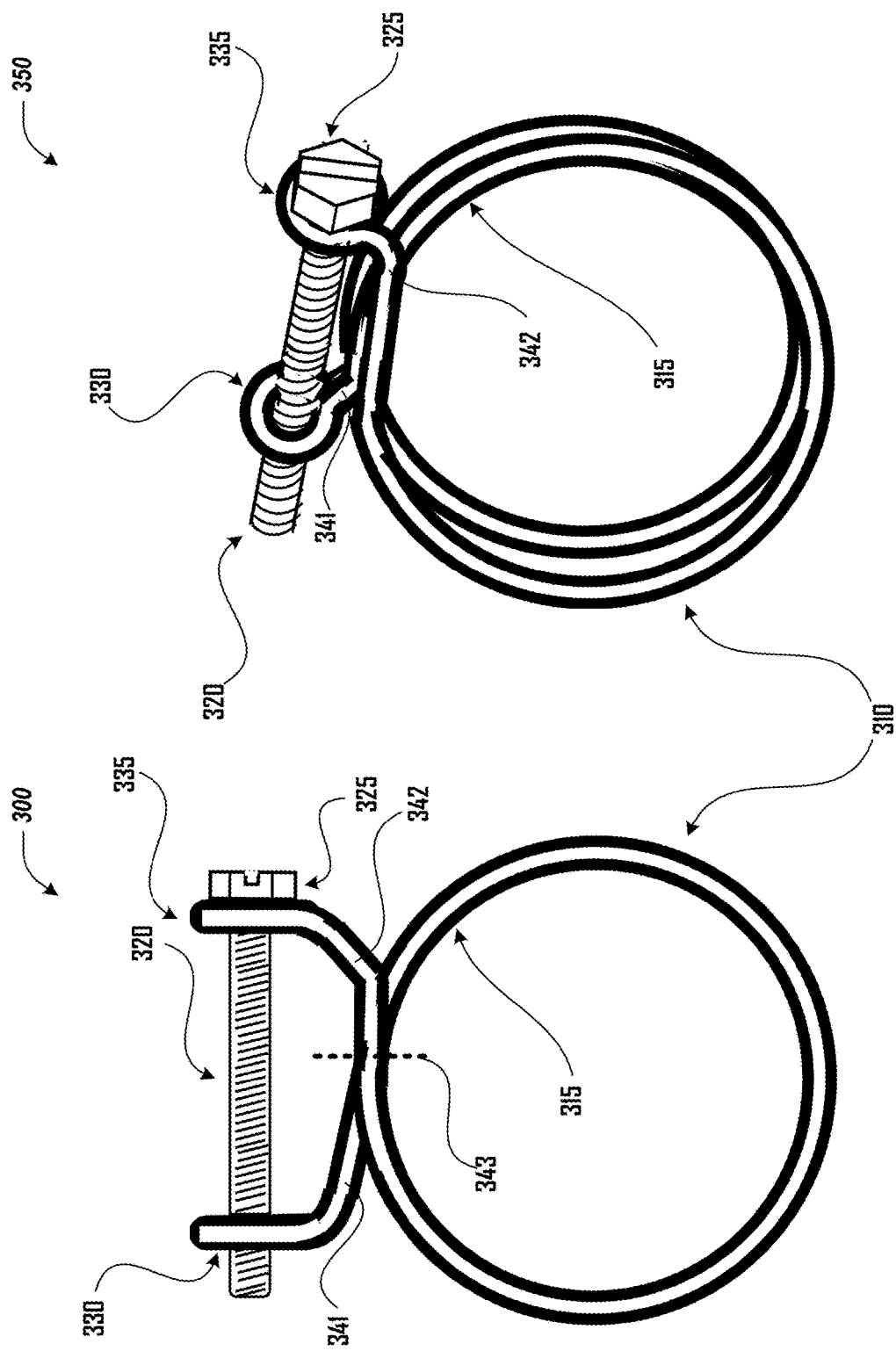

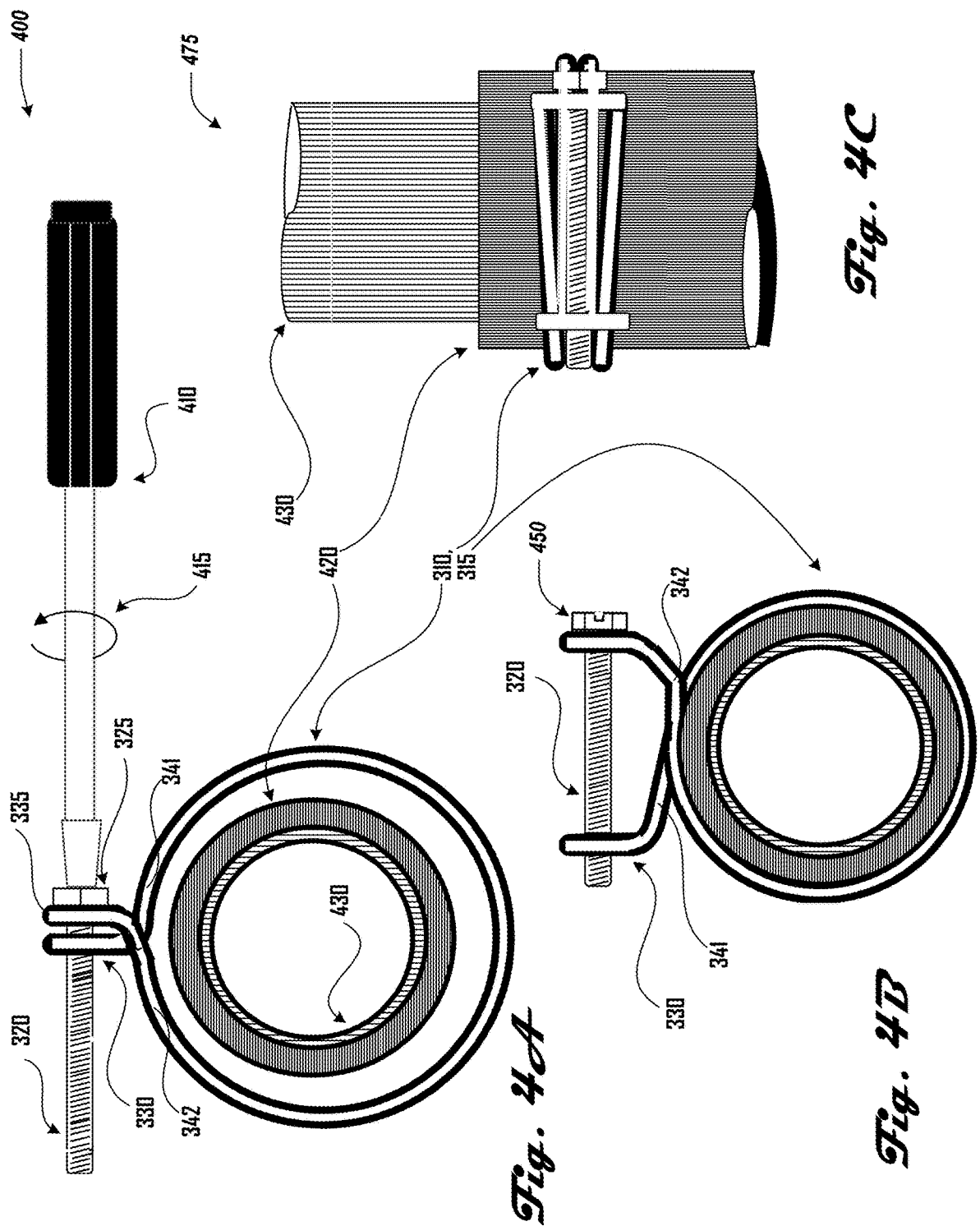

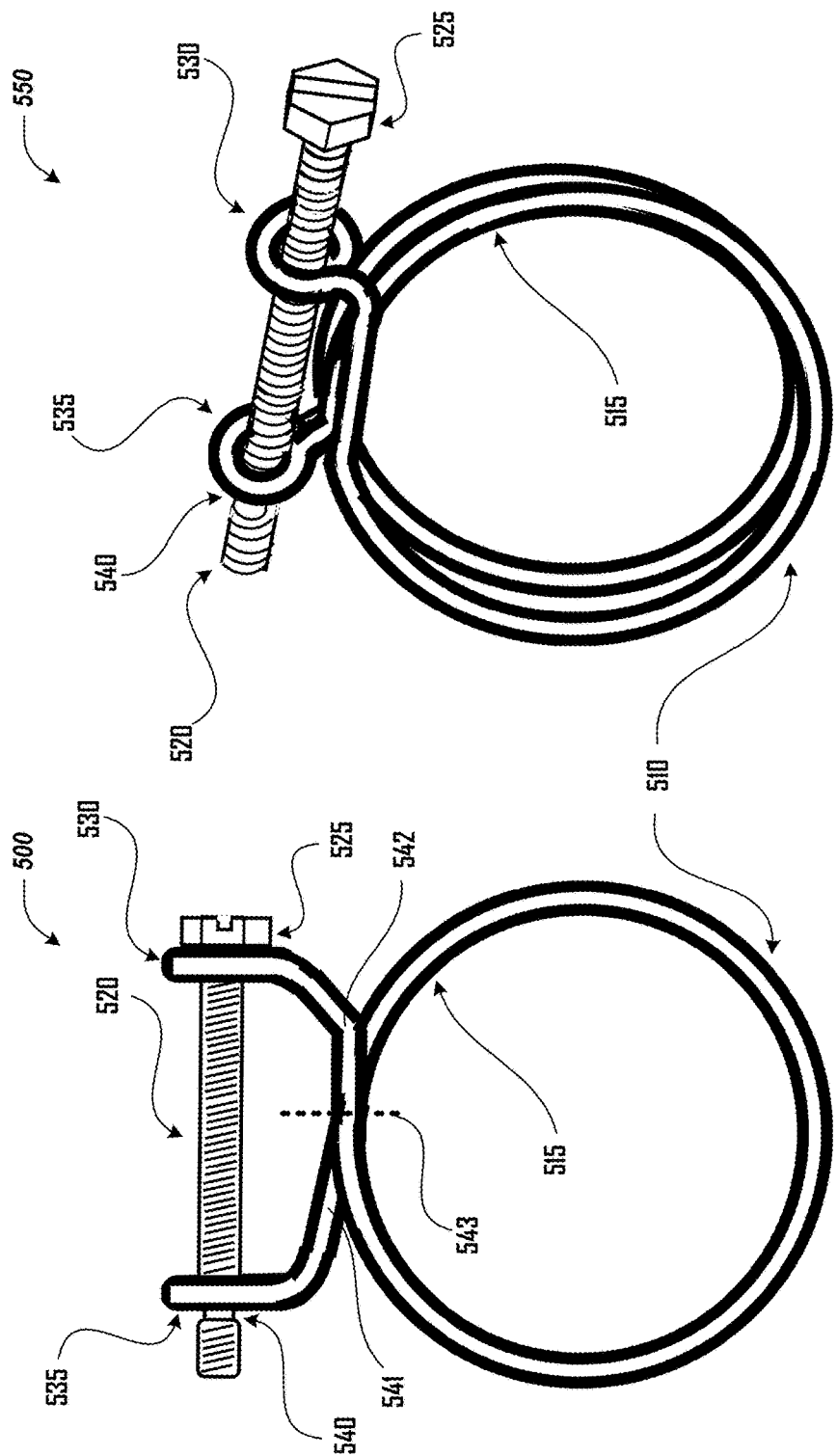

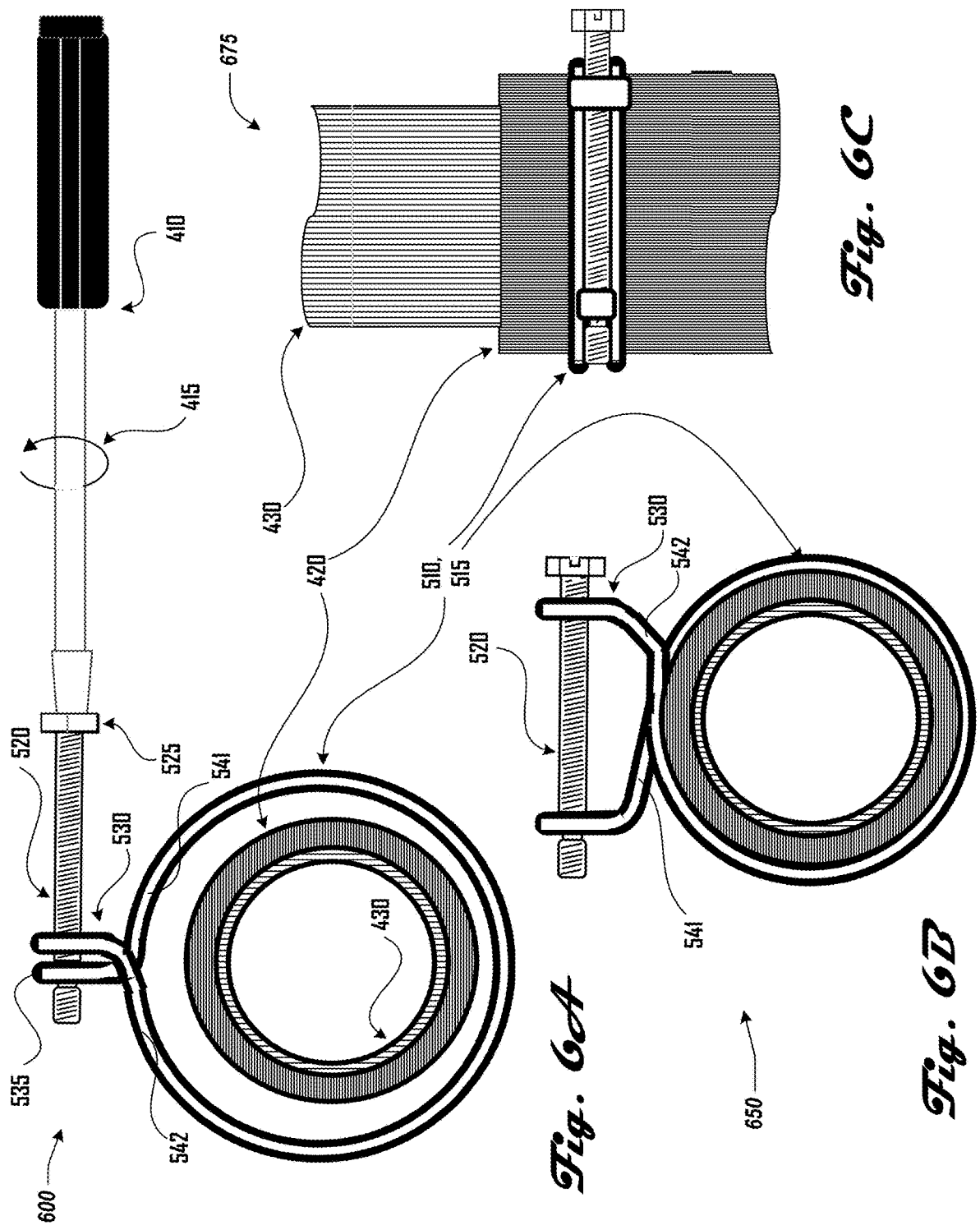

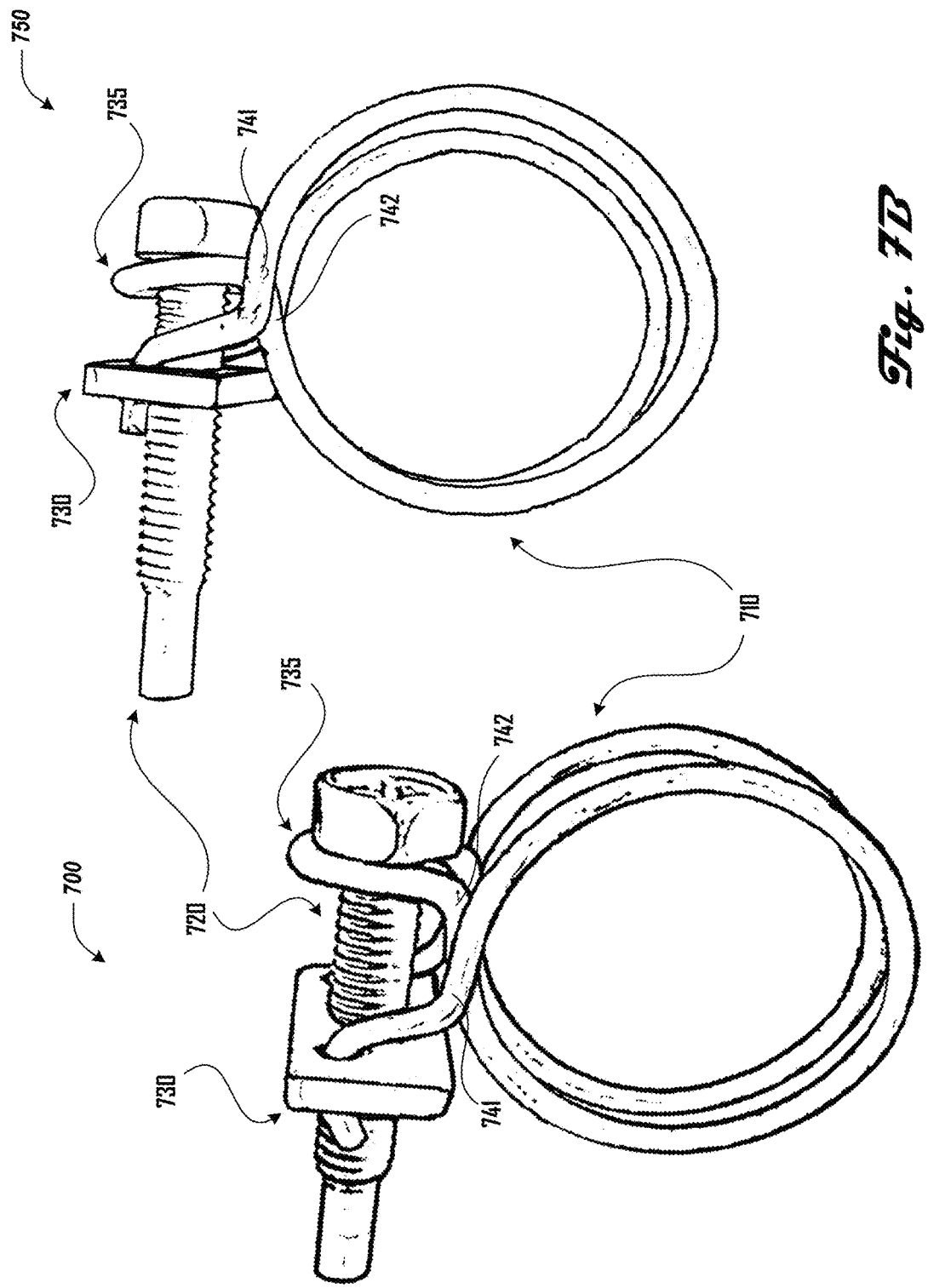

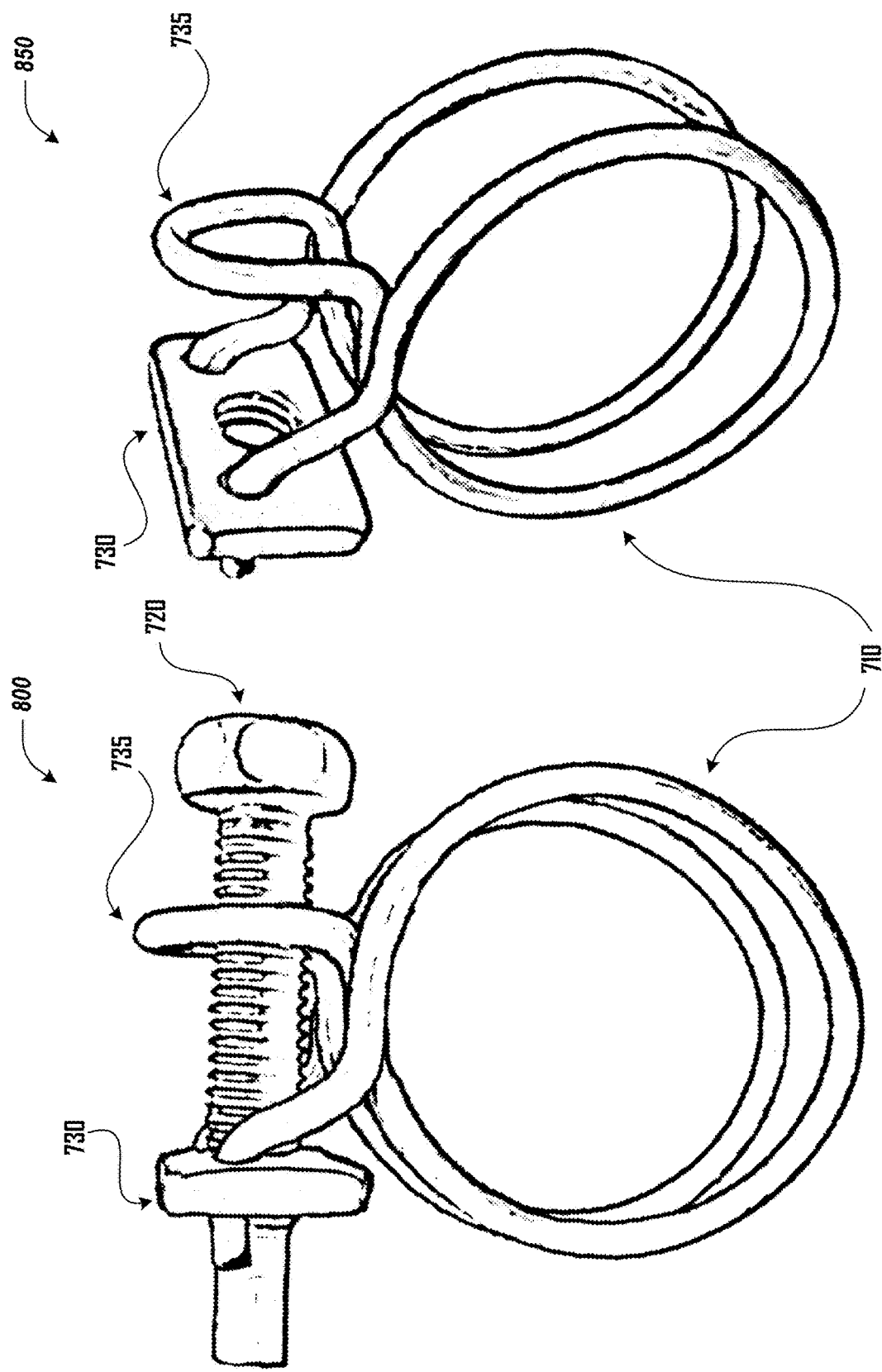

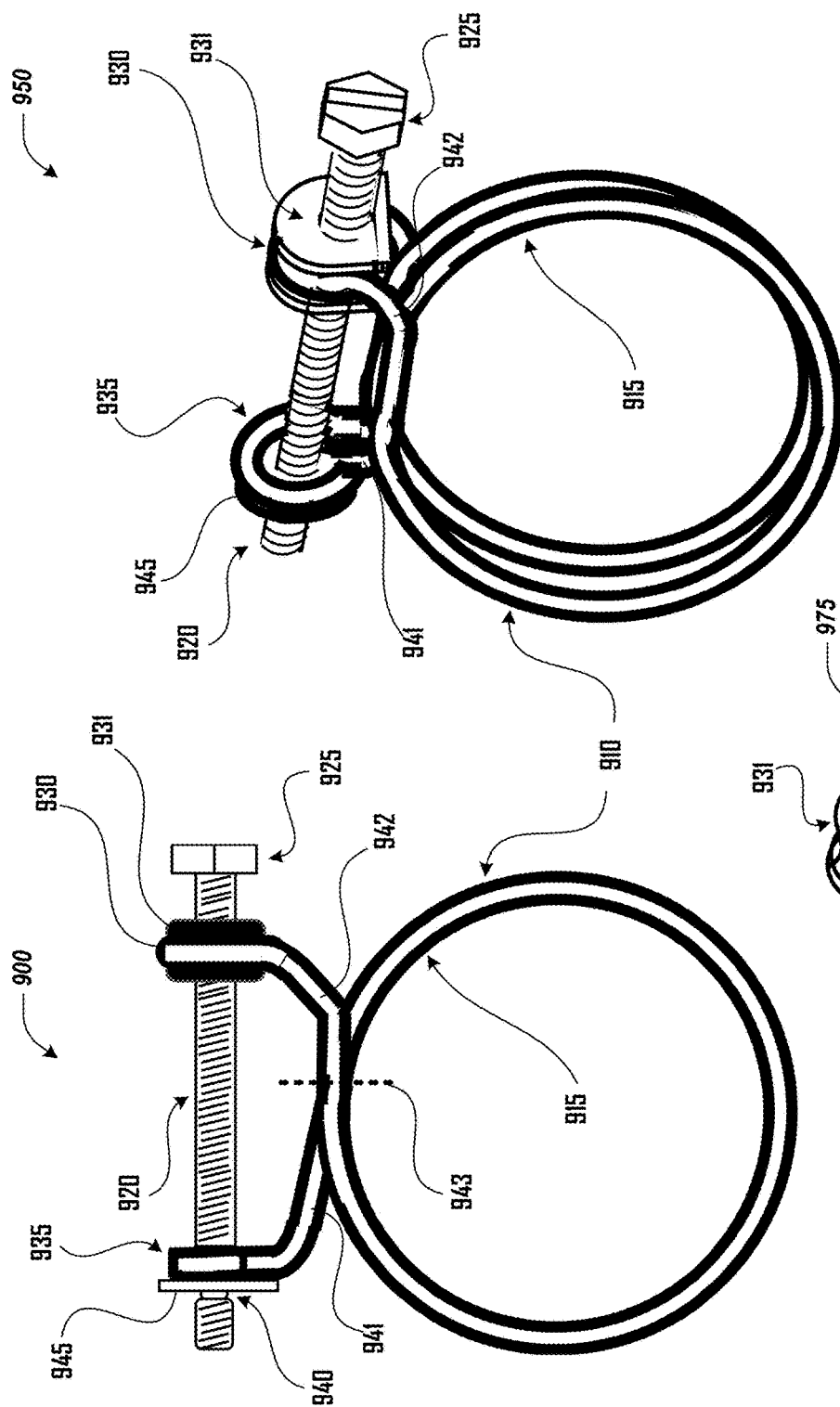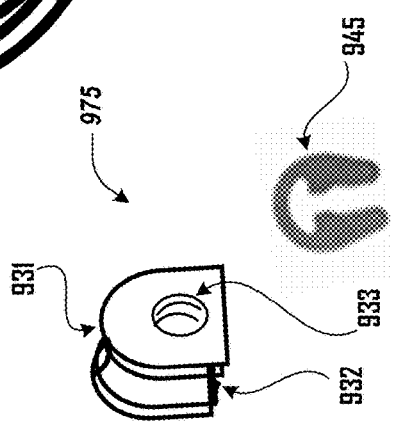

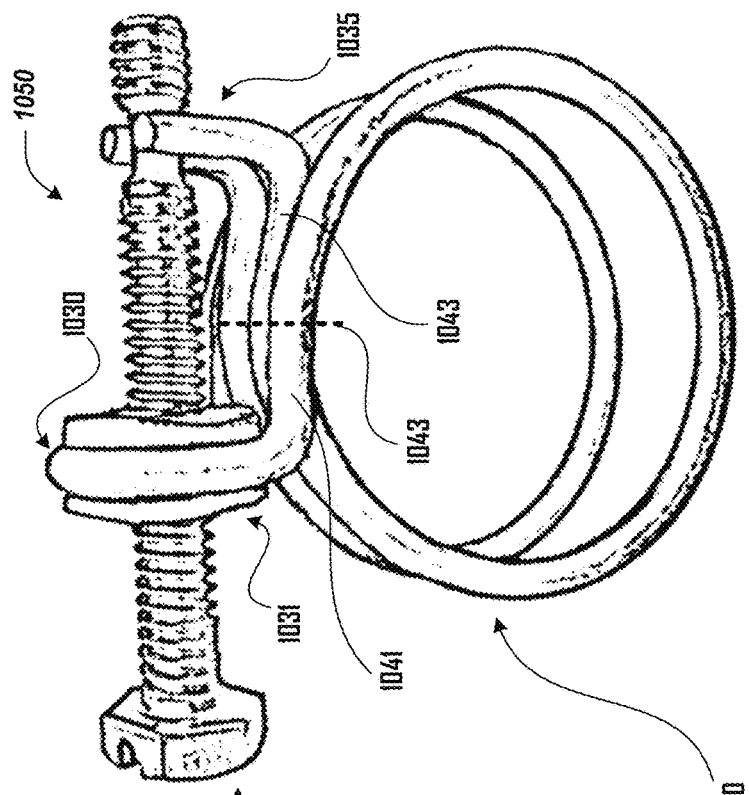
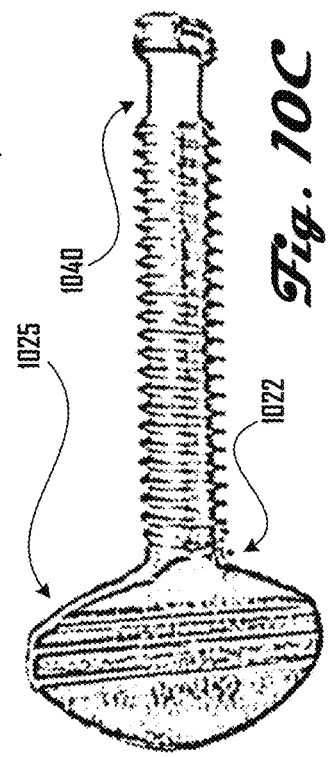
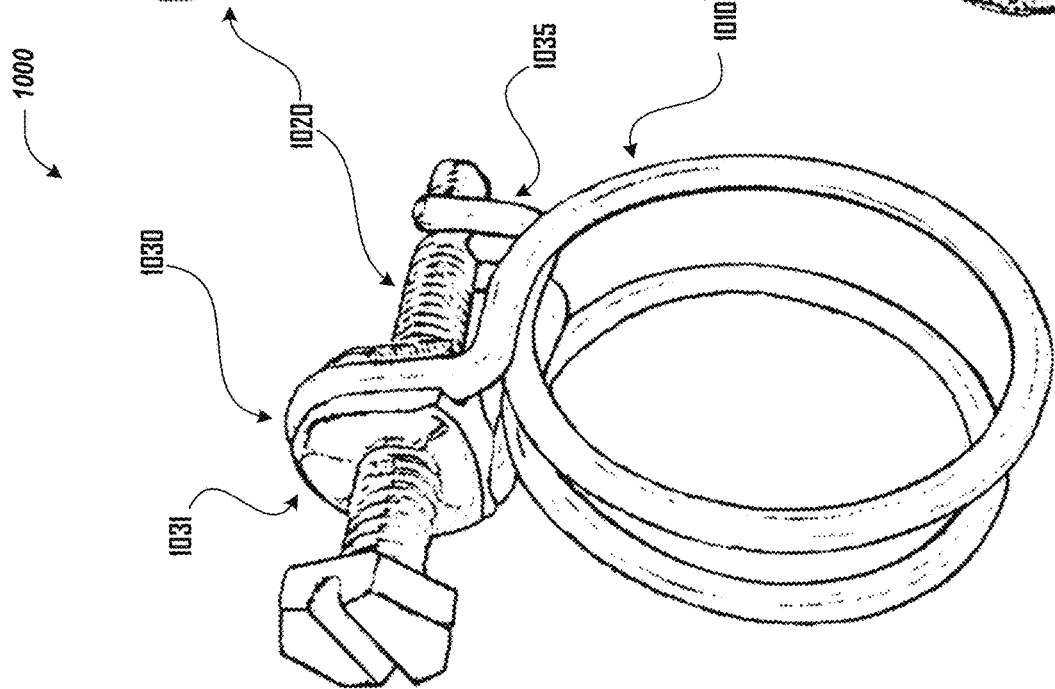
Fig. 10A
Fig. 10B
Fig. 10C

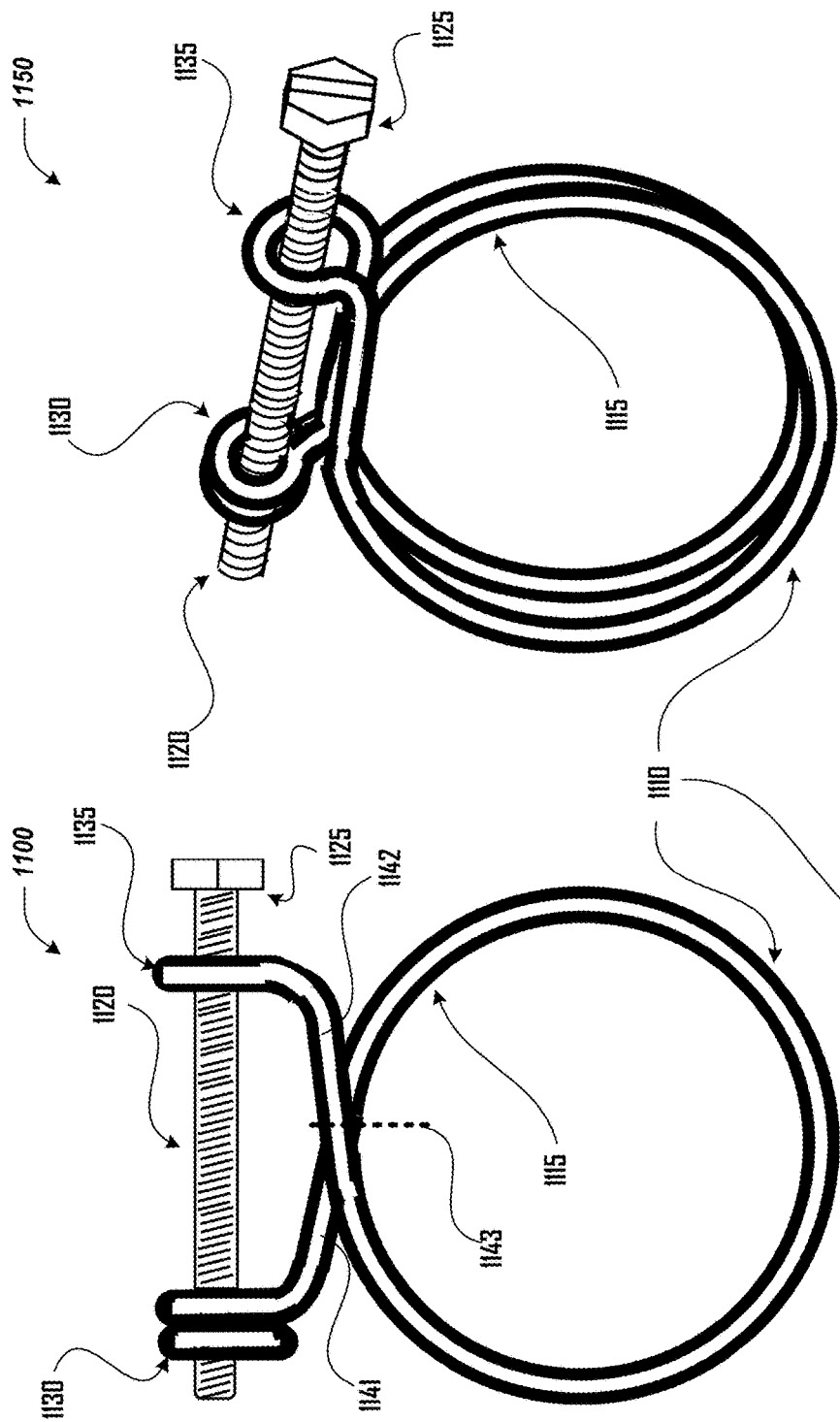

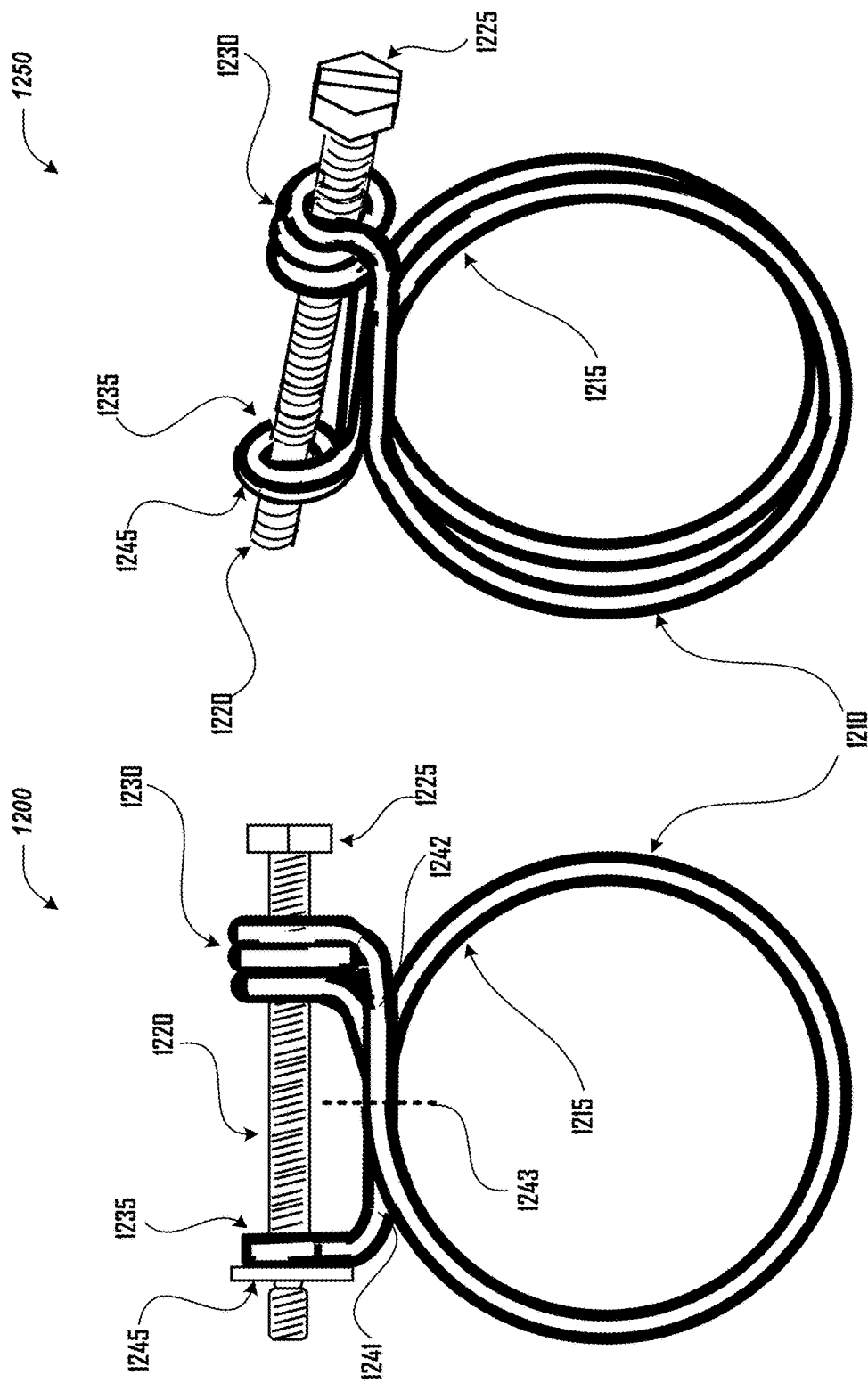

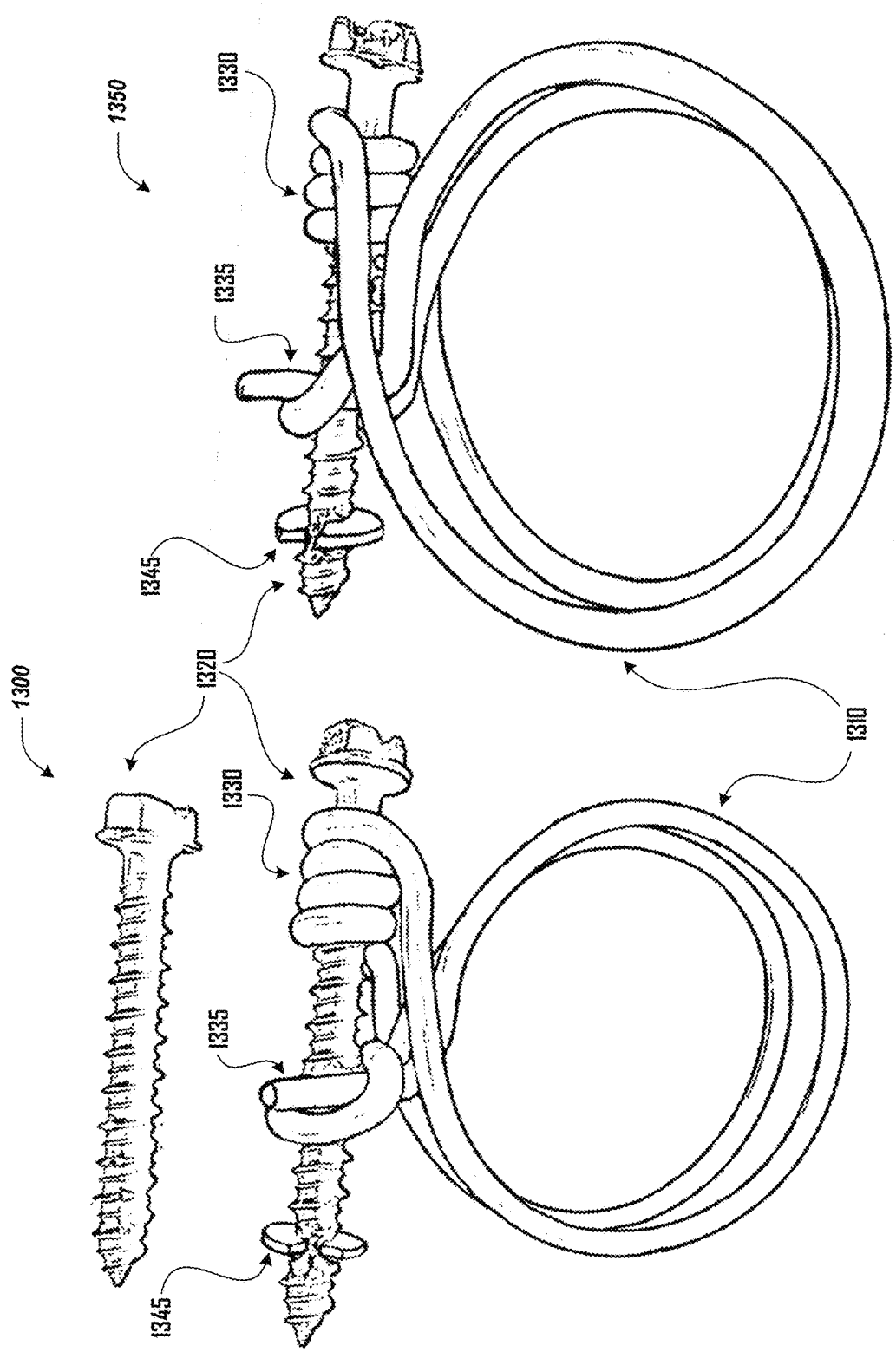

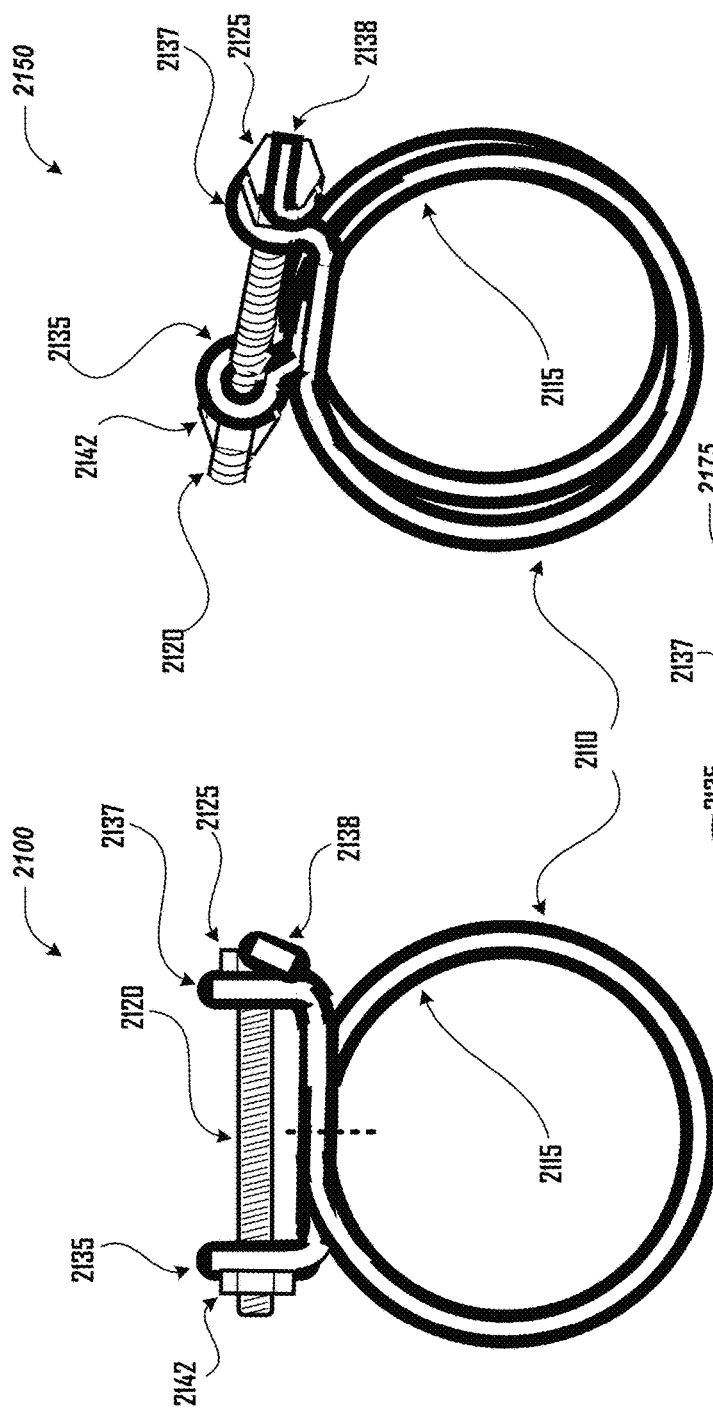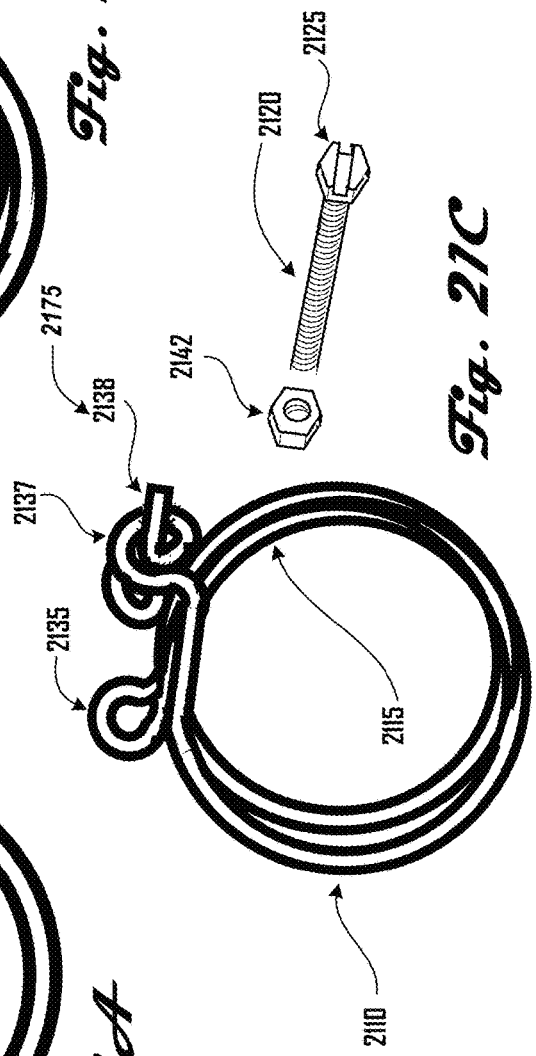

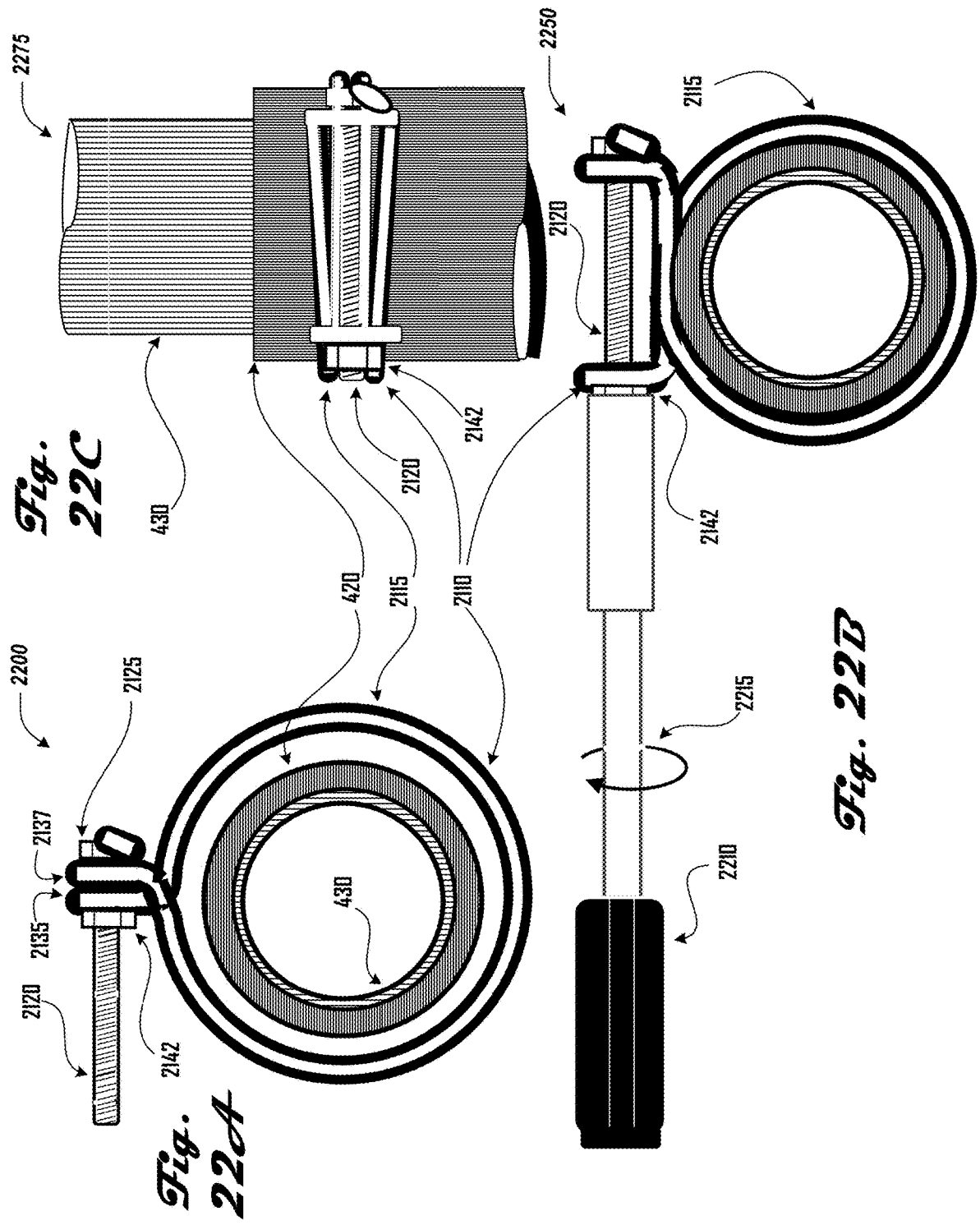

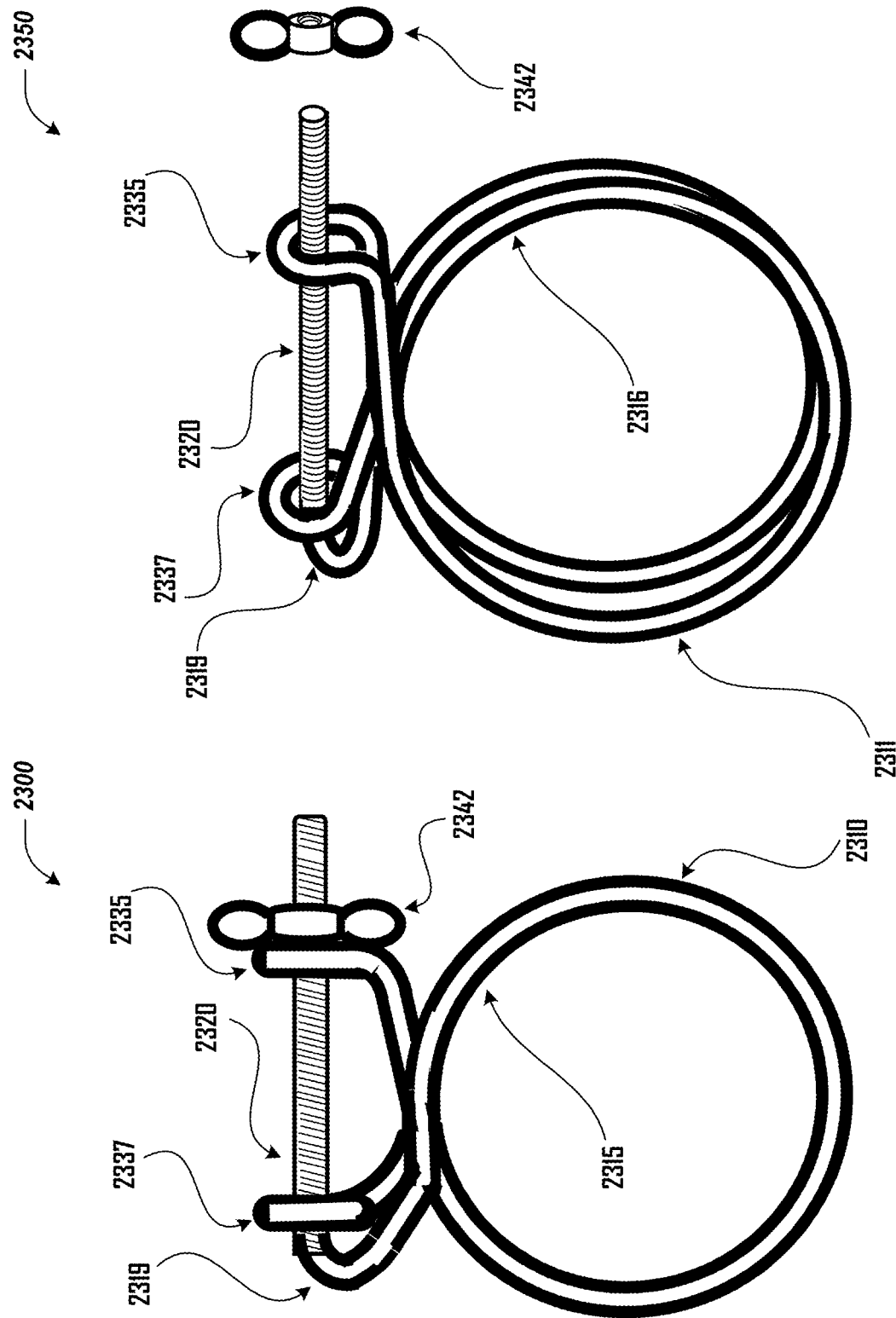

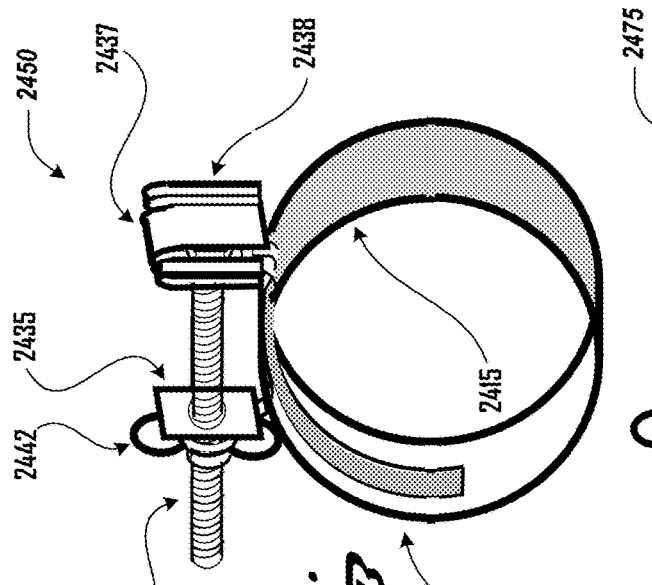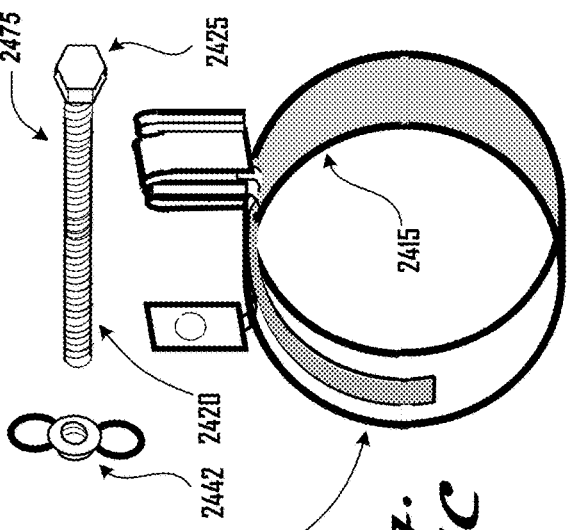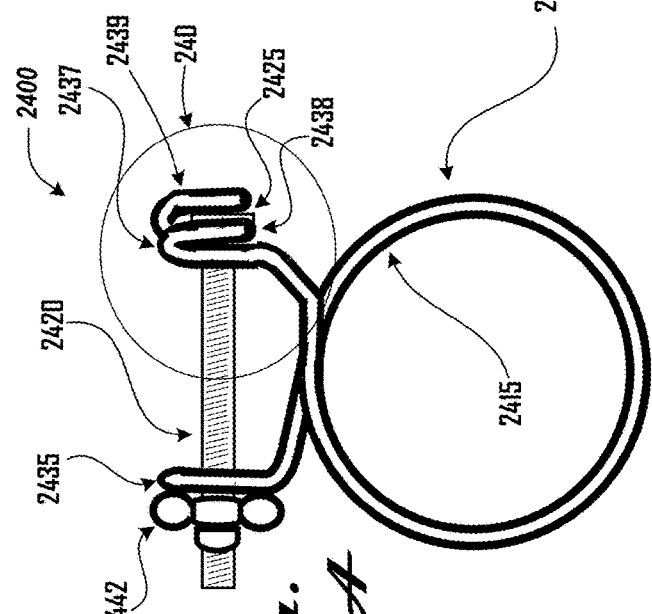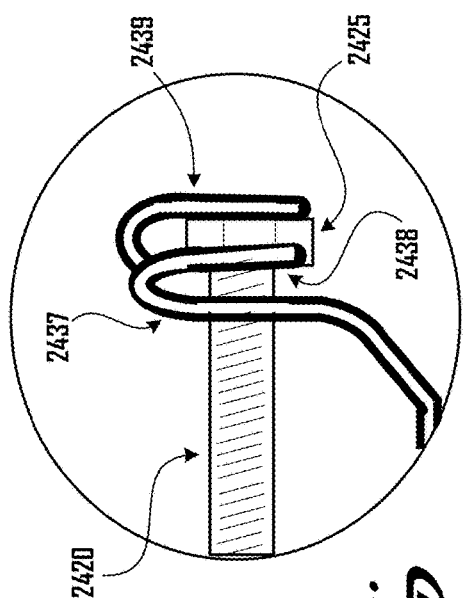

SPRING CLAMP WITH INSTALLATION AND REMOVAL CAPABILITY

CROSS-REFERENCE TO RELATED APPLICATIONS

This application is a non-provisional of, claims the benefit of, and incorporates by this reference U.S. provisional patent application No. 62/843,320, filed May 3, 2019. An Application Data Sheet filed herewith forms a part of the present application, and all priority documents to which it refers are incorporated by reference herein in their entirety.

FIELD

This disclosure is directed to improved apparatus for, systems for, and methods to create, install, and remove spring clamps.

BACKGROUND

A hose clamp is a device used to secure and create a seal between a hose and a rigid tube, pipe end, barb, or nipple fitting ("fitting"). In operation, a typical hose clamp is adjusted to a diameter greater than that of a hose and is slid over an open end of the hose. The open hose end and hose clamp are then placed over a fitting and the hose clamp is slid down the hose to overlap with the fitting. Then the diameter of the hose clamp is reduced (as in the case of a wire clamp or a worm gear clamp) or it is allowed to reduce (as in the case of a spring clamp). Reduction in the diameter of the hose clamp compresses the hose onto and creates a seal between hose and fitting.

Species of known hose clamps include worm-drive band clamps (referred to herein as "screw clamp" or "worm gear clamp"), spring clamps, wire clamps, and ear clamps. Other devices to secure a hose to a fitting include compression fittings (in which a ferrule is compressed onto the hose), push-fit fittings (in which the hose is inserted into a compression sleeve), swage fittings (in which a stiff collar is compressed onto the hose), clamp fittings (in which two blocks are tightened onto sides of the hose), and crimp bands (which use a crimp instead of a screw and threaded band).

Hose clamps are commonly used on fluid conduits, e.g., automotive cooling and appliance water system hoses, ranging from fractions of an inch up to several inches in diameter. To ensure a tight securement and seal between the hose and the tube, hose clamps may be designed to provide even pressure around the entire circumference of the hose, without gaps. This is accomplished by using a clamp material formed into the shape of the perimeter of the hose and fitting.

Wire clamps and worm gear clamps are both species of "non-spring clamps", so called herein because the clamp does not comprise a spring. Wire clamps comprise a wire structure. An example of a prior art wire clamp is illustrated in FIG. 2. The wire structure forms a loop body, generally with a spherical shape, corresponding to a hose. The two ends of the wire structure overlap. The terminal ends of the wire structure hold or form structures that are referred to as "tangs". A first tang of a wire clamp rotatably holds a threaded fastener in a relationship with a first end of the wire structure; a second tang holds a threaded structure, such as a bushing or nut. The threaded structure engages with threads in the fastener. The two tangs may be driven apart by the threaded fastener to increase the distance between the tangs, to reduce the diameter of the wire clamp and to tighten it onto a hose and fitting; turning the fastener the other way may not increase the diameter. The wire clamp may need to be expanded, manually, in order to increase its diameter, so long as the fastener is loosened.

Worm gear clamps are also non-spring clamps. Worm gear clamps comprise a threaded band which forms a loop, with a portion of the band overlapping with itself. A fastener of a worm gear clamp is rotatably held within a first tang, at one end of the loop, while threads of the fastener engage with a thread pattern in the overlapping end of the band, which passes through the first tang. Turning the fastener, engagement of the fastener with the first tang and with the threaded pattern in the band, causes the diameter of the worm gear clamp change in size so that it can be installed on or removed from a hose and fitting.

However, and as noted, worm clamps and wire clamps are not and do not comprise springs. They are non-spring clamps. In non-spring clamps, compressive force is provided exclusively by the fastener. When the fastener works backward out of its threaded receptacle, which occurs over time and is accelerated by vibration, when the hose thins over time, or when the clamp corrodes, compressive force is reduced. In addition, non-spring clamps are prone to being under-tightened or over-tightened. Consequently, non-spring clamps are not used in many contexts in which require a continuous compressive force, such as, for example, with respect to hydraulic lines in engines.

Spring wire and spring band clamps ("spring clamps") are spring steel, e.g. a wire or band, that is formed into a shape that matches the outside perimeter of, e.g., a hose. Ends of the spring steel are angled out to form structures, also called tabs or tangs. An example of a prior art spring clamp is illustrated in FIG. 1A.

The installation of the prior art spring clamp is accomplished by bringing the tangs together with a tool, e.g., pliers, thus enlarging the diameter of the spring clamp and allowing it to be positioned on a hose and an underlying fitting. Releasing the tangs allows them to separate and return to a state with a reduce diameter, resulting in uniform pressure on the hose and fitting. Spring action from the spring wire or band applies constant pressure on the hose and fitting; such constant pressure may be beneficial or required in the context of hoses subject to internal pressure or vibration.

However, force required to bring the tangs of a spring clamp together may be more than can be generated by unaided human fingers. In such circumstances, mechanical advantage may be required; mechanical advantage may be obtained from special purpose tools or pliers. Space for a tool to generate the force required to bring the tangs together for installation or removal may be limited in a particular application. In addition, spring clamps are known to release rapidly in uncontrollable and undesirable ways from tools used to bring the tangs together, which may result in injury and damage. An example of a spring clamp in a special purpose tool is illustrated in FIG. 1B.

Manufacture of both non-spring clamps and spring clamps occurs in a highly competitive marketplace. Units are produced in bulk, with an emphasis on cost reduction, not on features. Consumers of such clamps—such as, for example, manufacturers of machinery which include clamped hoses or people who install irrigation pipe—must experimentally determine the suitability of clamps for the consumers' different needs. Manufacturers of spring clamps do not even commonly provide the spring force of their spring clamps; users must experimentally determine whether a particular spring clamp provides enough compressive force for a particular application.

There exists a need for a clamp that has benefits of a spring clamp and also comprises a built-in tool, wherein the built-in tool may be used to compress and release the spring clamp and to control the release of potential energy by the spring, so that such a spring clamp can be safely used in the many contexts which require the use of spring clamps, without the need for a separate tool, such as a special purpose tool or pliers.

BRIEF DESCRIPTION OF THE DRAWINGS

FIGS. 3A-3B illustrate side elevation and perspective views of a wire spring clamp comprising a fastener and tangs to control a potential energy of and to change a diameter of a loop region of the wire spring clamp, in accordance with an embodiment.

FIGS. 4A-4C illustrate installation onto a hose of the wire spring clamp of FIGS. 3A and 3B, in accordance with an embodiment.

FIGS. 5A-5B illustrate side elevation and perspective views of a wire spring clamp comprising a fastener and tangs to control a potential energy of and to change a diameter of a loop region of the wire spring clamp, in accordance with an embodiment.

FIG. 5C illustrates a fastener with an unthreaded portion for use in the wire spring clamp of FIGS. 5A-5B, in accordance with an embodiment.

FIGS. 6A-6C illustrate installation onto a hose of the wire spring clamp of FIGS. 5A and 5B, in accordance with an embodiment, in accordance with an embodiment.

FIGS. 7A-7B illustrate perspective views of a wire spring clamp comprising a fastener and tangs to control a potential energy of and to change a diameter of a loop region of the wire spring clamp, in accordance with an embodiment.

FIGS. 8A-8B illustrate perspective views of the wire spring clamp of FIGS. 7A-7B in which the fastener is not enlarging the diameter the clamp, in accordance with an embodiment.

FIGS. 9A-9B illustrate a wire spring clamp comprising a fastener and tangs to control a potential energy of and to change a diameter of a loop region of the wire spring clamp, in accordance with an embodiment.

FIG. 9C illustrates a threaded bushing and a snap-ring washer for use in the wire spring clamp of FIGS. 9A-9B, in accordance with an embodiment.

FIGS. 10A-10B illustrate perspective views of a wire spring clamp comprising a fastener and tangs to control a potential energy of and to change a diameter of a loop region of the wire spring clamp, in accordance with an embodiment.

FIG. 10C illustrates a perspective view of a fastener configured for use in the wire spring clamp of FIGS. 10A-10B.

FIGS. 11A-11C illustrate a wire spring clamp comprising a fastener and tangs to control a potential energy of and to change a diameter of a loop region of the wire spring clamp, in accordance with an embodiment.

FIGS. 12A-12B illustrate a wire spring clamp comprising a fastener and tangs to control a potential energy of and to change a diameter of a loop region of the wire spring clamp, in accordance with an embodiment.

FIGS. 13A-13B illustrate perspective views of a wire spring clamp comprising a fastener and tangs to control a potential energy of and to change a diameter of a loop region of the wire spring clamp, in accordance with an embodiment.

FIGS. 21A-21C illustrate a wire spring clamp comprising a fastener and tangs to control a potential energy of and to change a diameter of a loop region of the wire spring clamp, in accordance with an embodiment.

FIGS. 22A-22C illustrate installation onto a hose of the wire spring clamp of FIGS. 21A-21C, in accordance with an embodiment.

FIGS. 23A-23B illustrate a wire spring clamp comprising a fastener and tangs to control a potential energy of and to change a diameter of a loop region of the wire spring clamp, in accordance with an embodiment.

FIGS. 24A-24D illustrate a band spring clamp comprising a fastener and tangs to control a potential energy of and to change a diameter of a loop region of the band spring clamp, in accordance with an embodiment.

DETAILED DESCRIPTION

Figure 1B:
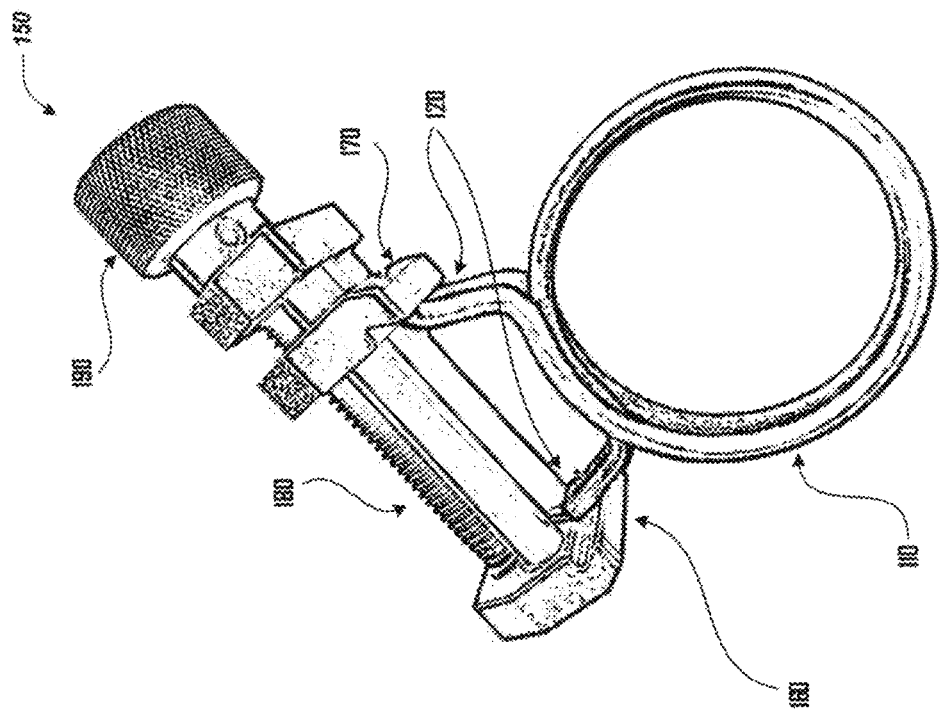
FIGS. 1A-1B illustrate perspective and side views of a prior art wire spring hose clamp requiring use of a tool for installation or removal.

This application discloses a spring clamp that comprises a spring. The spring is formed from a spring material. The spring is formed with a loop region, a first overlap region, a second overlap region, and two tangs. A first tang may be at an end of the first overlap region and a second tang may be at an end of the second overlap region. The first and second tangs may be formed from the spring material and/or may comprise additional elements or structures, discussed further herein.

References herein to "first tang" or "second tang" are generally according to sequence of word appearance in relation to an embodiment. Unless explicitly noted, all instances of "first tang" do not have to share the same characteristics or elements when referring to different embodiments. The specification may recite in one location that a "first tang" in a first embodiment is threaded and may recite in a second location that a "first tang" in a second embodiment is not threaded; such instances of "first tang" in the first and second embodiments do not refer to the same tang. Similarly, unless explicitly noted, all instances of "second tang" do not have to share the same characteristics or elements. Similarly, unless explicitly noted, all instances of "first overlap region" or of "second overlap region" are generally according to sequence of word appearance in relation to an embodiment and do not have to share the same characteristics or elements when referring to different embodiments.

The spring clamp further comprises a fastener. The fastener may be threaded; e.g., the fastener may be a bolt or screw.

The disclosed spring of the spring clamp has a state with a lowest potential energy; e.g. when the spring is not compressed or expanded beyond its state with lowest potential energy. The state with lowest potential energy may also be referred to herein as the "relaxed state" of the spring).

Changing the distance between the tangs may change a diameter of the loop region of the spring clamp and the potential energy state of the spring clamp. In embodiments of the spring clamp disclosed herein, the first and second tangs engage with the fastener, such that a distance between the tangs can be changed through rotation of the fastener or through rotation of a nut which may be interposed, for example, between the fastener and at least one of the tangs.

When the spring of the spring clamp is in its relaxed state (with lowest potential energy), the loop region has a first diameter. Decreasing the distance between the tangs with the fastener converts kinetic energy from the fastener into potential energy in the spring of the spring clamp, increases the potential energy of the spring above the relaxed state, increases the first diameter of the loop region to a second diameter, wherein the second diameter is larger than the first diameter. With the larger second diameter, the spring clamp may then be placed over the end of, for example, a hose. The spring clamp and hose may then be positioned over a fitting.

When the spring of the spring clamp is in the potential energy state above the relaxed state, when the tangs have been brought together by the fastener, and when the loop region has the second diameter, e.g., when the spring clamp and hose have been positioned over a fitting, increasing the distance between the tangs with the fastener releases potential energy from the spring, allows the loop region to contract toward the first diameter, allows the loop region to compress around the hose, and may cause the spring clamp to hold the hose on the fitting, through potential energy in and compressive spring force of the spring. The released potential energy is converted into kinetic energy in, for example, movement of the tangs, in slightly easier rotation of the fastener as it is rotated, and into heat, for example, in threading between the fastener and one of the tangs.

When the spring of the spring clamp is in its relaxed energy state (with lowest potential energy), increasing the distance between the tangs with the fastener converts kinetic energy from the fastener into an increase in potential energy in the spring of the spring clamp, and decreases the diameter of the loop region (unless the loop region is prevented from contracting by, for example, a hose). This may also be referred to as an "overdriven" state. In such overdriven state, at least some of the additional potential energy of the spring is held by the fastener and the tangs. In this overdriven state, the fastener may provide additional compressive force on an enclosed hose and fitting and/or the fastener may resist vibration or other forces which might otherwise cause the fastener to back out of the tangs.

Use of a fastener to remove or add potential energy to the spring of the disclosed spring clamp with the built-in tool is safer than removing or adding potential energy to prior art spring clamps with tools (or with fingers), inasmuch as when a prior art spring clamp undergoes uncontrolled release of potential energy, the prior art spring clamp may spring out of the tool in a dangerous or undesirable manner. In addition, the disclosed spring clamp incorporates into its structure a tool to remove or add potential energy to the spring of the disclosed spring clamp, unlike prior art spring clamps, which require use of a separate tool.

Prior art wire clamps comprise fasteners and tangs, though the fasteners and tangs of prior art wire clamps do not operate in the same way. In a prior art wire clam, when the fastener is turned to drive the tangs of the prior art wire clamp apart, a diameter of a loop region of the prior art wire clamp is reduced in size by the fastener. If a hose is present within the loop region, and if a fitting is within the hose, force provided exclusively by the fastener compresses the wire clamp tangs onto the hose and fitting. The fastener compresses the wire clamp tangs onto the hose and fitting; the loop region of the prior art wire clamp communicates the force provided by the fastener into the hose and onto the fitting. Force from the fastener must remain in order for the prior art wire clamp to maintain compression on the hose and fitting. Potential energy of the prior art wire clamp is at its peak when the fastener is providing this force. Because they are not designed as springs, only a relatively small amount of potential energy (in comparison to the disclosed spring clamp) is stored in the hose and in the wire and tangs of the prior art wire clamp. However, prior art wire clamps and other non-spring clamps are subject to failure from a variety of causes, as discussed herein. When failure occurs, the relatively small amount of potential energy stored in the wire and hose is released; when this happens, prior art wire clamps and non-spring clamps are known to fail, unless they are continuously re-tightened to restore the potential energy. When the fastener of the prior art wire clamps is turned the other way, to drive the tangs together, the fitting may relax, because the potential energy of the fastener is released, but the fitting may not open, unless the prior art wire clamp is manually opened. In fact, in embodiments, the fastener of the prior art wire clamp may be entirely removed during installation of the prior art wire clamp on a hose; the fastener of prior art non-spring clamps is only needed after the prior art non-spring clamp is installed on the hose, when the fastener is then needed to draw tension on the non-spring clamp and the underlying hose and fitting.

In contrast, the fastener of the disclosed spring clamp may not be removed during installation. In contrast, the fastener of the disclosed spring clamp must remain in place and must drive the tangs of the disclosed spring of the spring clamp together in order for the disclosed spring clamp to be installed on a hose. Potential energy of the spring of the disclosed spring clamp increases to a peak during this installation step, when the disclosed spring clamp is installed on the hose and before installation on a fitting, and decreases as the fastener and tangs are used i) to control release of the potential energy in the spring of the disclosed spring clamp and ii) to allow the diameter of the loop region to reduce in size as the potential energy is released. This is unlike prior art wire clamps, in which potential energy of the prior art wire clamp is at its lowest during this installation step, when the prior art wire clamp is installed on a hose. As noted, potential energy stored in prior art wire clamps and in the hose used in relation to a prior art wire clamp reaches a peak when the fastener of the prior art wire clamp drives the tangs of the prior art wire clamp apart to hold the prior art wire clamp on a hose. Unfortunately, and as noted, this peak level contains a relatively small amount of potential energy; this relatively small amount of potential energy is quickly lost when the hose degrades or when the fastener backs out of tangs of the prior art wire clamp. As noted, and in contrast, the fastener of the disclosed spring clamp pulls the tangs together to increase potential energy stored in the spring of the spring clamp and to allow the disclosed spring clamp to then be installed on a hose. When the fastener of the disclosed spring clamp is engaged with the tangs to allow the tangs to move further apart, the potential energy of the spring of the disclosed spring clamp decreases, the interior diameter of the loop region contracts, and the disclosed spring clamp may then apply remaining potential energy stored in the disclosed spring clamp to the hose and fitting. Though this remaining potential energy is less than the potential energy which the disclosed spring clamp had when the tangs were driven together to enable installation on a hose, this remaining potential energy is nonetheless large, compared to the potential energy stored in a prior art wire clamp when clamped on a hose, and the disclosed spring clamp will remain in place and provide compressive force on hose and fitting, notwithstanding degradation and decomposition of the hose.

In fact, the fastener of the disclosed spring clamp may be entirely removed after it is installed on a hose and fitting, and the disclosed spring clamp will remain in place. This is entirely unlike prior art wire clamps, in which the fastener must remain in place during its service life.

In addition to the foregoing, and as described further herein, embodiments of the disclosed spring clamp may comprise means to increase a potential energy of the spring of the spring clamp, such as means to change a distance between ends of the spring of the spring clamp. For example, in embodiments, a first tang may be threaded while a second tang may not be threaded. In embodiments, neither the first tang nor the second tang may be threaded, though a nut, with threading, may be interposed between the first tang and the fastener. In these embodiments, threading in the fastener may engage with threading in the first tang or in the nut, such as when the fastener is rotated. The second tang that is not threaded may contain, guide, or hold the fastener, may allow rotation of the fastener, and may engage with the fastener to hold the fastener in a fixed translational relationship with the tang, notwithstanding that the fastener may not have a fixed rotational relationship with the tang; such a tang may be referred to herein as a "fastener retainer". In embodiments, additional structures, such as a washer, may be between the fastener and one or both tangs, which structure acts to prevent engagement of threading of the fastener with threading of the tang or of a nut or to prevent binding or interference between a head of the fastener and a tang. In embodiments, additional structures, such as a bushing, may be between the fastener and one or both tangs, which structure acts as a nut, to engage with threading of the fastener and to then push against a tang. In such embodiments, the fastener may engage with the first and/or second tang and/or with the nut to change a distance between the tangs, e.g. to draw the tangs together or apart.

In embodiments of the disclosed spring clamp, means to increase a potential energy of the spring of the spring clamp may comprise a fastener that is made of or secured to one end of the spring, e.g. at an end of first overlap region. Such a fastener may not rotate, e.g. the fastener may be a fixed fastener. The portion of the spring from which the fixed fastener extends, e.g. the terminus of the first overlap region, may be referred to herein as a "tang" or a first tang. The fixed fastener may pass through or proximate to a second tang at the other end of the spring, e.g. at an end of second overlap region. In such an embodiment, a nut may rotate and engage with the fixed fastener and the second tang to change a distance between first tang and the second tang. Changing the distance between the tangs changes a potential energy of the spring clamp and may change a diameter of the spring clamp, as discussed herein.

By way of example, a user of the disclosed spring clamps need only turn the head of the fastener or nut with common tools or by hand (e.g., a screwdriver, a socket, or no tool at all as in the case of a wing headed or other knurled or hand-operable fastener) to operate embodiments of the disclosed spring clamp. With typical threads, in embodiments with two tangs, turning the fastener in one direction may pull the tangs together. Pulling the tangs together increases the diameter of the loop region of the spring clamp and holds the spring clamp open without continuous effort by the user. This allows the user to slide the clamp onto a hose easily and then to position the hose end over the fitting. The user may then reverse the rotation of the fastener or nut; this may allow the spring to release at least some of its potential energy and to reduce the diameter of the loop region, thus allowing the spring clamp to tighten around a hose and secure the hose on a fitting, through potential energy in and compressive spring force provided by the spring of the spring clamp.

In embodiments, means to rotate a fastener or a nut may comprise, e.g., a thumb screw, screwdriver bit head, ratchet/socket driver head, hex head, wrench, crank arm, wing nut, knob, or the like, to allow a user to turn the fastener or nut.

In embodiments, threading of a fastener or a nut or the like may be fine (narrow pitch) or coarse (wide pitch). In embodiments, the spring of the spring clamp may be formed or manufactured from wire, sheet material, a band, or other shapes of materials. In embodiments, the spring of the spring clamp may be material such as steel, other metals with memory (e.g., ferrous or non-ferrous metals that hold a memory of a shape and has a spring constant), glass, plastics, polymers, composites, such as carbon fiber, or any material with a spring constant and that is suitable for a particular application. In embodiments, threading and loading on the threads may be matched to a spring constant of a spring and to a peak potential energy of the spring, such that the threads will not strip when the spring clamp is at peak potential energy and such that the threads will not slip and allow the fastener or nut to back out of the threads.

In addition to other advantages discussed herein, the disclosed spring clamp offers significant advantages over prior art non-spring hose clamps and prior art spring hose clamps.

For example, prior art spring hose clamps (including wire spring hose clamps and flat band spring hose clamps) typically require special tools, not built into the spring hose clamp, to overcome spring tension to install or remove them. It is not easy to expand a typical spring clamp to be able to install it on a hose, particularly in cases where the spring clamp must exert significant force to perform its function of applying pressure to create a seal between the hose and the tube or pipe. Similar use of tools is required to overcome the spring force of the spring clamp to loosen and remove the clamp at a later time, enabling the hose to be removed from the tube.

Tools used to expand or contract a typical prior art spring clamp may require user training and may be specific to use, for example, only for installation of the spring clamp or only for removal of the spring clamp. Such tools often have limits due to limited access space. Most tools are physically larger than the spring they are operating on. Using common, non-specialized tools, such as pliers, to squeeze the ends of prior art spring hose clamps poses safety risks. When applying pressure to open a prior art spring clamp, the tangs or ends of the spring clamp where the pliers are applied may not ensure that the tool is held in place—thus, the spring clamp may slip or work loose and shoot away from the tool in a dangerously rapid, uncontrolled fashion, and in a random direction. This may cause injury to the user or other persons in the area, and/or damage to the user's work or surroundings. Accordingly, prior art spring hose clamps pose a safety issue.

Existing prior art worm gear clamp (also known as a "Jubilee Clip"), wire clamps, and other non-spring hose clamps may not require special tools to expand or contract, but they are an inadequate replacement for spring hose clamps. As discussed herein, a major advantage of spring hose clamps over non-spring hose clamps is that spring clamps provide a constant compressive force on a hose, thus keeping the hose tight on a fitting, notwithstanding that the hose may weaken with age, experience thinning, and/or the fastener of the non-spring clamp may back out, all of which may reduce the effect of the non-spring clamp. Such non-spring clamps may need to be retightening over time, or may fail. This may not be required with respect to spring clamps, because spring clamps apply a constant compressive force, subject only to fatigue or relaxation of the spring steel over time. Accordingly, existing non-spring hose clamps fail to adequately address needs addressed by spring hose clamps. However, as noted above, prior art spring hose clamps generally require tools to be opened and closed, which may not be possible or desirable in a given circumstance.

In various embodiments, as described further herein, the disclosed spring hose clamp addresses these problems. With the disclosed spring clamp, a user no longer needs a specialized tool of potentially limited availability, increased cost, and awkward use restrictions. Instead, a user can employ standard, widely available hand tools, such as a screwdriver, to engage and turn the fastener; depending on the type of fastener chosen, a user may even operate the spring clamp and its fastener by hand in a way which may not have been previously possible. Using hands or hand tools to loosen the disclosed spring clamp no longer poses a danger of suddenly releasing a powerful spring, providing important safety benefits.

In addition, the disclosed spring hose clamp provides constant spring tension to secure a hose to a fitting.

In some embodiments, the fastener may be "overdriven" or turned further in the non-releasing direction (e.g., counterclockwise in some embodiments) to provide compressive force or pressure on the hose and fitting from the fastener, and/or to place tension on the fastener to prevent it from moving. In some embodiments, the fastener may be removed after the spring clamp is installed to reduce complexity and weight of the installed spring clamp. In some embodiments, the fastener may be removed after the spring clamp is installed and then replaced with a different fastener. This may allow use of different fasteners in a spring clamp, e.g., to replace a damaged fastener, to use a fastener of a different length, or to use a fastener having a different head or engagement type, such as a hand-operable fastener.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein. Embodiments set forth below are primarily described via examples which may have diameters of approximately half an inch to several inches in size, which are shown for ease of reference; embodiments in other sizes may be made. Embodiments are illustrated primarily in the context of securing hoses to fittings. However, despite the common name "hose clamps", these clamps can also be used in applications other than to secure relatively pliable hoses or rigid tubes or other bodies to rigid fittings or to other object. For example, one or more of the disclosed spring clamp may be secured to a body, such as a tube, hose, board, or the like, and may be used as a securement point to secure the body to another body. Accordingly, the embodiments described herein are illustrative examples and in no way limit the disclosed technology to any particular size, geometry, construction, or application.

The phrases "in an embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used herein "releasable", "connect", "connected", "connectable", "disconnect", "disconnected," and "disconnectable" refers to two or more structures which may be connected or disconnected, generally without the use of tools (examples of tools including screwdrivers, pliers, drills, saws, welding machines, torches, irons, and other heat sources) or with the use of tools but in a repeatable manner (such as through the use of nuts and bolts or screws). As used herein, "attach," "attached," or "attachable" refers to two or more structures or components which are attached through the use of tools or chemical or physical bonding, but wherein the structures or components may not generally be released or re-attached in a repeatable manner. As used herein, "secure," "secured," or "securable" refers to two or more structures or components which are connected or attached.

The disclosed spring clamp can take a variety of form factors. FIGS. 1-25 illustrate several different arrangements and designs. The illustrated spring clamps are not an exhaustive list; in other embodiments, a spring clamp could be formed in different arrangements. However, it is not necessary to show such implementation details to describe illustrative embodiments.

Figure 1A:
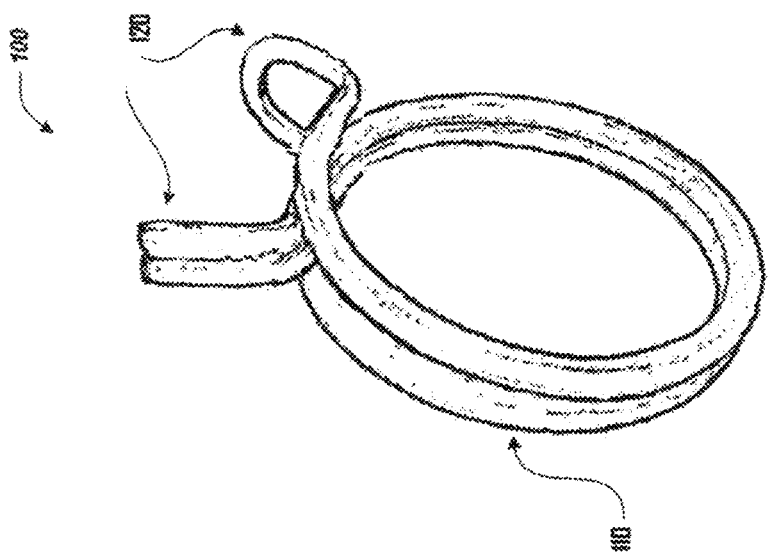

FIGS. 1A-1B illustrate oblique views of a prior art wire spring hose clamp 110 requiring use of a tool for installation or removal. FIG. 1A illustrates an oblique perspective view 100 of wire spring hose clamp 110 that is missing safety and convenience features of the spring clamps disclosed in this application. wire spring hose clamp 110 has two ends 120 and forms a ring. To be fitted over a hose, ends 120 of wire spring hose clamp 110 must be pressed toward each other, typically using a tool, such as pliers. Squeezing the ends together increases the diameter of the ring. As discussed above, this can be inconvenient, difficult, incompatible with circumstances of use, and even dangerous.

FIG. 1B illustrates a side perspective view of wire spring hose clamp 110 of FIG. 1A, with an example of a specialized compression tool to increase an inside diameter of clamp 110. As illustrated, jaws 160 and 170 of the compression tool must be carefully aligned over the two ends 120 of the clamp 110 and tightened to ensure proper engagement. Then, by turning knurled knob 190, a user can force jaw 170 down threaded rod 180 toward jaw 160 to increase the diameter of and open hose clamp 110. This requires care to ensure that the tool does not accidentally slip off the two ends 120, and additionally requires significant room and access around hose clamp 110 to operate the tool—not to mention requiring availability of such a specialized tool in the first place to remove or install the hose clamp 110. In addition, the specialized compression tool of FIG. 1B comprises more parts than the spring clamps disclosed herein. The spring clamp with installation and removal capability disclosed herein solves problems such as these.

Figure 2:
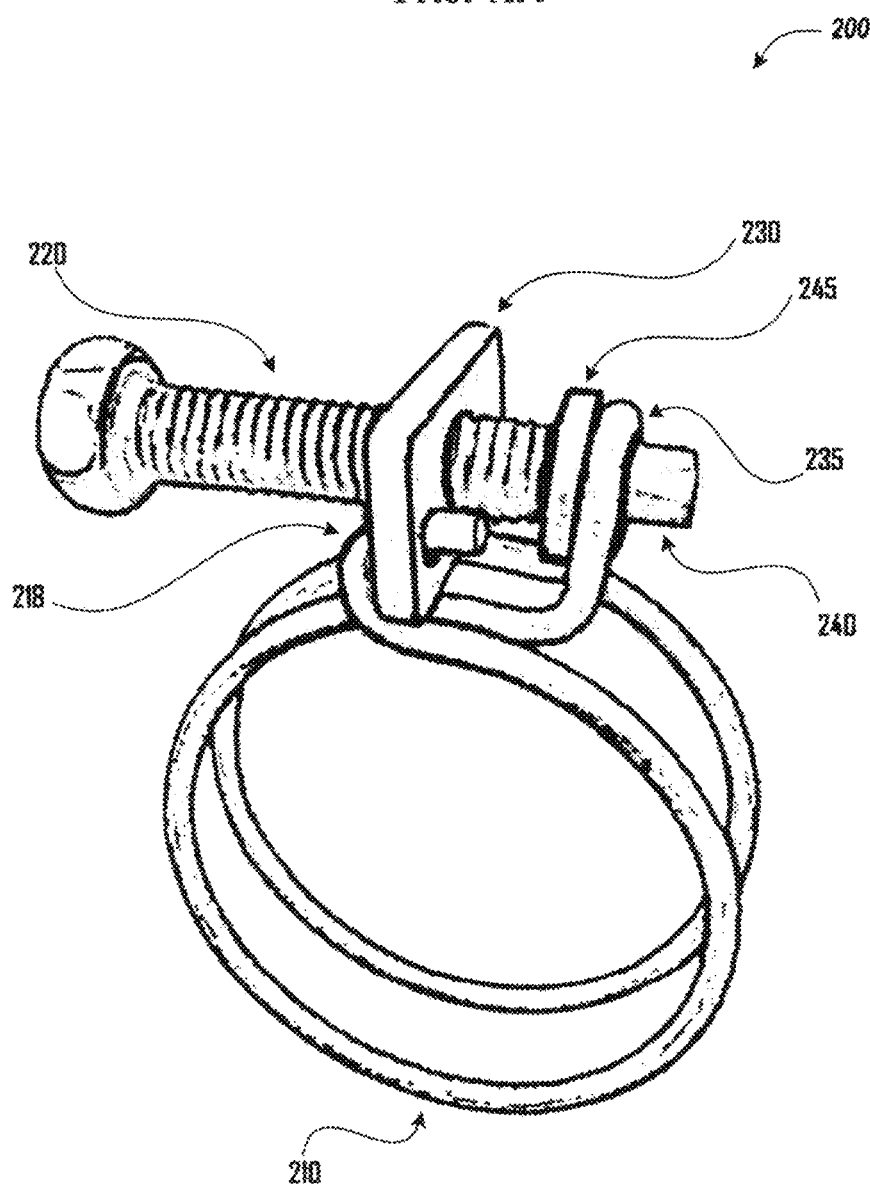
FIG. 2 illustrates a perspective view of a prior art non-spring wire hose clamp in which a screw may tighten the non-spring wire hose clamp.

FIG. 2 illustrates a perspective view 200 of a prior art wire hose clamp 210 having a screw 220 that can only tighten the clamp. This type of wire hose clamp 210 does not rely on compressive spring force to secure a hose around a fitting; a screw compresses wire hose clamp 210 to compress wire hose clamp 210 onto a hose and secure the hose to a fitting. In the illustrated example, wire hose clamp 210 is formed of a piece of heavy wire (e.g., steel), doubled and formed into a ring shape with one end overlapping the other. Although it resembles a spring clamp, the diameter of the ring shape is fixed at the time of manufacture or purchase to be large enough to fit over a particular diameter hose. The heavy wire of wire hose clamp 210 does not provide a compressive force on hose, when installed. Captive nut 230 is secured to one tang end by wire bend 218, and captive screw 220 is threaded through nut 230 to push on the other tang end 235, e.g., by pressing washer 245 against bent wire 235. When the screw is turned, the tangs of wire 218 and 235 are pushed apart, reducing inside diameter of hose clamp 210 and tightening hose clamp 210 around, for example, a hose to secure it on a barb.

Notably, any elastic spring force in wire hose clamp 210 actually forces the clamp 210 open, so it is not an adequate substitute where compressive spring force is required to secure a hose to a fitting. Indeed, the design of wire hose clamp 210 calls for the wire to have as little spring force or memory as possible, e.g. to not be a spring, because the user must overcome that spring force to tighten the wire hose clamp 210. Because of the arrangement of captive nut 230 on wire bend 218 and use of washer 245 on the end of the screw 220 to push on the bent wire 235, the user cannot use screw 220 to pull ends 218 and 235 together to open wire hose clamp 210. Indeed, washer 245 may slide off end 240 of the screw 220 in that case.

As discussed herein, force from screw 220 must remain in order for wire hose clamp 210 to maintain compression on the hose and fitting. Potential energy of wire hose clamp 210 is at its peak when screw 220 is providing this force. Because they are not designed as springs, only a relatively small amount of potential energy (in comparison to the disclosed spring clamp) is stored in the hose and in the wire and tangs of wire hose clamp 210. Wire hose clamp 210 is subject to screw 220 backing out of nut 230 and to the degradation and decomposition of the hose. When this happens, the relatively small amount of potential energy stored in wire hose clamp 210 and hose is released; when this happens, wire hose clamp 210 will fail, unless it is continuously re-tightened to restore the potential energy. Screw 220 of wire hose clamp 210 may be entirely removed during installation of wire hose clamp 210 on a hose.

FIGS. 3A-3B illustrate wire spring clamp 310 with fastener 320 threaded into fastener-engaging point-end tang 330 ("first tang") and fastener 320 head 325 free to rotate in head-end free-rotation tang 335 ("second tang"), in accordance with an embodiment. FIG. 3A illustrates side elevation view 300 of wire spring clamp 310 and fastener 320. FIG. 3B illustrates perspective view 350 of wire spring clamp 310 and fastener 320. Spring clamp 310 forms loop region 315; loop region 315 provides compressive spring force around the circumference of a hose, such as shown and described further herein with reference to FIGS. 4A-4C. Spring clamp 310 is illustrated in FIGS. 3A and 3B in its relaxed, closed state that would apply pressure to a hose within the loop region 315. Spring clamp 310 further comprises first overlap region 341 and second overlap region 342. First tang 330 is at an end of first overlap region 341. Second tang 335 is at an end of second overlap region 342. When spring clamp 310 is in its relaxed state, or state with lowest potential energy, first overlap region 341 and second overlap region 342 overlap with loop region 315 from overlap location 343 to the first tang and the second tang.

Fastener 320 includes head 325, a threaded length, and a point or terminus at an opposite end of fastener 320 from head 325. Head 325 can be any type for operation by hand or with tools readily available to the user, such as hex, socket cap, Phillips, slotted, star, wing, knob, etc. The point can be any shape, e.g., cup, flat, or oval. In some embodiments, a portion of the length of the fastener 320 near the head may be an unthreaded shank.

Fastener 320 passes through head-end free-rotation tang 335 (or "second tang"); the second tang is configured to allow fastener 320 to rotate within it and may be referred to herein as a "fastener retainer". Threads on the length of fastener 320 engage with point-end tang 330 (or "first tang"). In various embodiments, fastener-engaging point-end tang 330 is configured to engage threads on fastener 320 such as by tapping threads into the material of fastener-engaging point-end tang 330, by securing a threaded nut, bushing, or insert to fastener-engaging point-end tang 330, or by wrapping the spring material of fastener-engaging point-end tang 330 around the space for fastener 320 at a pitch that engages threads of fastener 320 (as described in greater detail below in relation to FIGS. 11A-11C and 12A-12B).

FIGS. 4A-4C illustrate installation of wire spring clamp 310 of FIGS. 3A-3B onto hose 420, with fastener 320 threaded into point-end tang 330 ("first tang") and fastener 320 head 325 end free to rotate within second tang 335, in accordance with an embodiment. FIGS. 4A and 4B illustrate side views or end views 400, 450 of wire spring clamp 310 and fastener 320 positioned around hose 420 fitted to a pipe, tube, or other fitting 430. FIG. 4C is a top view 475 corresponding to FIG. 4B.

Spring clamp 310 in FIG. 4A is in an expanded or enlarged diameter position with point-end tang 330 screwed toward head 325 and head-end free-rotation tang 335 by tool 410 (in this illustration, a slotted screwdriver) as indicated by turning motion 415. As illustrated in FIG. 4A, first overlap region 341 and second overlap region 341 are no longer overlapping loop region 315, though they may still be referred to with these labels herein. Loop region 315 of spring clamp 310, has been expanded in diameter from its relaxed, closed state, and stores potential energy provided by kinetic energy (torque) from tool 410. Potential energy and compressive spring force in loop region 315 is opposed by force provided by fastener 320 against point-end tang 330 ("first tang"), which force draws first tang 330 toward head-end free-rotation tang 335 ("second tang") and head 325. In this state, spring clamp 310 forms a gap between the spring clamp 310 and hose 620, with loop region 315 enlarged with portions of first overlap region 341 and second overlap region 342. This allows spring clamp 310 to be slid over hose 420 and for hose 420 to be slid over fitting 430 and allows spring clamp 310 to be positioned at a desired position and angle around hose 420. Because potential energy in and compressive spring force from the loop region 315 is opposed by fastener 320, first tang 330, and second tang 335, the user does not need to exert continuous force on the tangs of spring clamp 310 to keep spring clamp 310 open. Indeed, spring clamp 310 will remain open even if tool 410 is removed from head 325 of fastener 320, until or unless the user turns fastener 320 in the opposite direction to allow spring clamp 310 to release its potential energy or compressive force and provide compressive spring force around a circumference of hose 420.

FIGS. 4B and 4C illustrate spring clamp 310 of FIGS. 3A-3B after the user has released the potential energy or compressive spring force tension held by fastener 320 of FIG. 4A. In comparison to FIG. 4A, spring clamp 310 in FIG. 4B is shown closer to the relaxed, closed state, of spring clamp 310, applying compressive force or pressure to hose 420 within loop region 315. Fastener 320, point-end tang 330, and head-end free-rotation tang 335 allow the user to carefully and safely control the application of compressive spring force of spring clamp 310 to hose 420 as loop region 315 returns toward its relaxed diameter, with lower potential energy or lower compressive spring force, wherein the relaxed diameter is smaller than the outside diameter of the hose 420.

FIGS. 5A-5B illustrate wire spring clamp 510 with fastener 520 threaded into head-end tang 530 ("first tang") and fastener 520 point end free to rotate in point-end free-rotation tang 535 ("second tang" or "fastener retainer"), in accordance with an embodiment. FIG. 5A illustrates a side elevation view 500 of wire spring clamp 510 and fastener 520. FIG. 5B illustrates a perspective view 550 of wire spring clamp 510 and fastener 520. Spring clamp 510 forms loop region 515 which may provide compressive spring force, for example, around the circumference of a hose, such as shown and described further herein with reference to FIGS. 6A-6C. Spring clamp 510 is shown in its relaxed, closed state that would apply pressure to a hose within loop 515. Spring clamp 510 further comprises first overlap region 541 and second overlap region 542. First tang 530 is at an end of second overlap region 542. Second tang 535 is at an end of first overlap region 541. When spring clamp 510 is in its relaxed state, or state with lowest potential energy, first overlap region 541 and second overlap region 542 overlap with loop region 515 from overlap location 543 to the first tang and the second tang.

Fastener 520 includes head 525, a threaded length, and a point at the opposite end of the fastener 520 from head 525. As with fastener 320 of FIGS. 3A-3B, head 525 can be any type for hand operation or hand tool operation. Fastener 520 further comprises a non-threaded or unthreaded portion 540. FIG. 5C illustrates a side view 575 of fastener 520 with unthreaded portion 540 for use in the wire spring clamp of FIGS. 5A-5B. In the illustrated embodiment, unthreaded portion 540 has a diameter smaller than a major diameter of fastener 520.

Returning to FIGS. 5A-5B, threads on the length of fastener 520 engage with head-end fastener-engaging tang 530. In various embodiments, fastener-engaging tang 530 is configured to engage threads on the length of the fastener 520 such as by tapping threads into the material of fastener-engaging tang 530, securing a threaded nut, bushing, or insert to fastener-engaging tang 530, or by wrapping the material of fastener-engaging tang 530 around fastener 520 at a pitch that can engage threads of fastener 520.

Unthreaded portion 540 of fastener 520 passes through point-end free-rotation tang 535 ("fastener retainer"), which is configured to allow fastener 520 to spin within it. In the illustrated embodiment, free-rotation tang 535 is configured to keep fastener 520 captive, to not to engage the threads of fastener 520, and to hold fastener 520 is a fixed translational relationship with tang 535. For example, the diameter within the free-rotation tang 535 may be reduced or sized to only allow free rotation of the unthreaded portion 540 of the fastener 520 within it. Thus, when fastener 520 is turned to pull tangs 530 and 535 together (or to allow them to spread apart, or in some embodiments even to push them further apart), unthreaded portion 540 of fastener 520 stays confined within free-rotation tang 535. Free-rotation tang 535 thus pushes against the portion of fastener 520 at the end of unthreaded portion 540, which acts like a washer or stop nut to prevent fastener 520 from passing through free-rotation tang 535. A fixed or removable washer (e.g., a snap-ring washer), stop nut, jam nut, lock nut (e.g., a nylon insert "nylock" nut) or cap nut (not shown) on fastener 520 may also be used, potentially in addition, for this purpose. Free-rotation tang 535, point-end tang 330, and fastener 320 thus allow tangs 530 and 535 to be brought together by rotating fastener 520 to apply force or kinetic energy to tangs 530 and 535, which force opposes compressive force of ring 515, increases potential energy or compressive force in ring or loop region 515, and opens wire spring clamp 510 to a larger diameter than its relaxed circumference.

FIGS. 6A-6C illustrate installation of wire spring clamp 510 of FIGS. 5A-5C onto hose 420 with fastener 520 threaded into head-end tang 530 and fastener 520 point end free to rotate in accordance with an embodiment. FIGS. 6A and 6B illustrate side views or end views 600, 650 of wire spring clamp 510 and fastener 520 positioned around hose 420 fitted to a pipe, tube, or other fitting 430. FIG. 6C is a top view 675 corresponding to FIG. 6B.

Spring clamp 510 in FIG. 6A is in an expanded position with the head-end tang 530 screwed toward the point-end tang 535 by tool 410 (in this illustration, a slotted screw-driver) as indicated by turning motion 415. As illustrated in FIG. 6A, first overlap region 541 and second overlap region 541 are no longer overlapping loop region 515, though they may still be referred to with these labels herein. Loop region 515 of spring clamp 510, expanded in diameter from its relaxed or closed state, stores potential energy provided by kinetic energy (torque) from tool 410. Potential energy and compressive spring force in loop region 515 is opposed by force provided by fastener 520 against point-end tang 535 ("first tang") and head-end tang 530 ("second tang"), as fastener 520 draws tang 535 and 530 together. In this state, spring clamp 510 forms a gap between spring clamp 510 and hose 420. This allows hose 420 and wire spring clamp 510 to be slid over the fitting 430 and allows spring clamp 510 to be positioned at a desired position and angle around hose 420. Because potential energy in and compressive spring force from loop 515 is opposed by fastener 520, point-end tang 535, and head-end tang 530, the user does not need to exert continuous force on tangs 530 and 535 of spring clamp 510 to keep spring clamp 510 open. Indeed, spring clamp 510 will remain open even if tool 410 is removed from head 525 of fastener 520, until or unless the user turns fastener 520 in the opposite direction to allow loop 515 to relax and release its potential energy and compressive force and provide compressive spring force, for example, around a circumference of hose 420.

FIGS. 6B and 6C show spring clamp 510 of FIGS. 5A-5C after the user has released the potential energy or compressive spring force tension held by fastener 520 of FIG. 6A. In comparison to FIG. 6A, spring clamp 510 in FIG. 6B is shown closer to its relaxed, closed state, with lower potential energy than as in FIG. 6A, applying compressive force or pressure to hose 420 within loop 515. Fastener 520, head-end tang 530, and free-rotation tang 535 allow the user to carefully and safely control the application of compressive spring force of spring clamp 510 to hose 420 as loop 515 returns toward its relaxed diameter, with lower potential energy and compressive spring force, which is smaller than the outside diameter of the hose 420.

FIGS. 7A-7B illustrate perspective views of a wire spring clamp having a screw, also referred to herein as a "fastener", that can loosen the spring clamp for installation or removal. Unlike prior art wire hose clamp 210 of FIG. 2, wire spring clamp 710 illustrated in FIGS. 7A-7B and 8A-8B operates as disclosed herein to allow a user to safely and conveniently counteract compressive spring force of wire spring clamp 710 to enlarge a central diameter of wire spring clamp 710, for example, allowing it to be safely and conveniently be installed on a hose. Schematically, wire spring clamp 710 is analogous to wire spring clamp 310 of FIGS. 3A-3B, in which fastener 320/720 is threaded into point-end fastener-engaging tang 330/730 ("first tang") and rotates freely within free-rotation tang 335/735 ("second tang" or "fastener retainer").

FIG. 7A illustrates a perspective view 700 of wire spring clamp 710 and fastener 720. In this example, wire spring clamp 710 is in its relaxed or closed position, and a head of fastener 720 is seated against head-end free-rotation tang 735 ("fastener retainer"). Spring clamp 710 further comprises first overlap region 741 and second overlap region 742. First tang 730 is at an end of first overlap region 741. Second tang 735 is at an end of second overlap region 741. When spring clamp 710 is in its relaxed state, or state with lowest potential energy, the first overlap region 741 and the second overlap region 742 overlap with loop region of wire spring clamp 710.

FIG. 7B illustrates a perspective view 750 of wire spring clamp 710 and fastener 720 in which fastener 720 has been rotated to engage with and drive point-end fastener-engaging tang 730 toward head-end free-rotation tang 735. In this example, an internal diameter of wire spring clamp 710 has increased to allow wire spring clamp 710 to be installed on or removed from a hose over a fitting. In this state, the spring of wire spring clamp 710 has higher potential energy than when it is in the state with lowest potential energy, illustrated in FIG. 7A.

As discussed, operation of wire spring clamp 710 may be contrasted with prior art wire hose clamp 210 of FIG. 2. Prior art wire hose clamp 210 is delivered with an interior diameter which fits around a hose or prior art wire hose clamp 210 may be expanded, manually, to fit around a hose. When fitted around a hose, but prior to being tightened, prior art wire hose clamp 210 is at its lowest state of potential energy. When positioned around a hose, the fastener in prior art wire hose clamp 210 may be turned to drive the tangs apart to tighten prior art wire hose clamp 210 and to reduce the diameter of the loop region of the prior art wire clamp around the hose. When this occurs around a hose, potential energy of prior art wire hose clamp 210, such as it is, is at its peak, with the potential energy stored in the hose and in the tangs of prior art wire hose clamp 210. The fastener of prior art wire hose clamp 210 may not be removed, after it is installed on a hose, without unsealing prior art wire hose clamp 210 from the hose.

In contrast, fastener 720 of wire spring clamp 710 may not be removed during the installation. In contrast, fastener 720 of wire spring clamp 710 must remain in place and must drive tangs 730 and 735 of wire spring clamp 710 together in order for wire spring clamp 710 to be installed on a hose. Potential energy of the spring of wire spring clamp 710 increases to a peak during this installation step, when wire spring clamp 710 is installed on the hose and before installation on a fitting. In contrast to potential energy of prior art wire hose clamp 210 which increases as prior art wire hose clamp 210 is tightened onto the hose, potential energy of the spring of wire spring clamp 710 decreases as the fastener and tangs are used i) to control release of the potential energy in the spring of wire spring clamp 710 and ii) to allow the diameter of the loop region of wire spring clamp 710 to reduce in size as the potential energy is released. In contrast to prior art wire hose clamp 210, fastener 720 of wire spring clamp 710 may be removed after wire spring clamp 710 is installed on a hose and wire spring clamp 710 will remain and provide a compressive force, so long as the exterior diameter of the hose is larger than the interior diameter of the loop region of wire spring clamp 710, when wire spring clamp 710 is in its relaxed state or state with lowest potential energy.

FIGS. 8A-8B illustrate perspective views of wire spring clamp 710 of FIGS. 7A-7B in which screw fastener 720 is not opposing compressive force of wire spring clamp 710 and wire spring clamp 710 has relaxed to a tightened position. FIG. 8A illustrates a perspective view 800 of wire spring clamp 710 and fastener 720 in which wire spring clamp 710 is in its relaxed or closed position in which fastener 720 is backed off from head-end free-rotation tang 735. Because fastener 720 is not engaging free-rotation tang 735, spring clamp 710 can freely expand or contract (e.g., with temperature changes) while maintaining compressive spring force tension on the full circumference of an encircled hose or other object. FIG. 8B illustrates a perspective view 750 of wire spring clamp 710 from which fastener 720 has been completely removed. FIGS. 8A-8B show some functions of the spring clamp of the present disclosure when not being installed or removed, including the ability to remove the fastener from the installed spring clamp, thereby reducing weight and complexity from an easily installable and removable spring clamp in a way that was not previously possible.

FIGS. 9A-9B illustrate wire spring clamp 910 with fastener 920 threaded into bushing 931 within head-end tang 930, in accordance with an embodiment. FIG. 9A illustrates a side view 900 of wire spring clamp 910 and fastener 920. FIG. 9B illustrates a perspective view 950 of wire spring clamp 910 and fastener 920. Spring clamp 910 forms loop region 915, available to provide compressive spring force, for example, around the circumference of a hose. Spring clamp 910 further comprises first overlap region 942 and second overlap region 941. Head-end tang 930 is at an end of first overlap region 942. Point-end tang 935 is at an end of second overlap region 941. When the spring of spring clamp 910 is in its relaxed state, or state with lowest potential energy, first overlap region 941 and second overlap region 942 overlap with loop region 915 from overlap location 943 to head-end tang 930 and point-end tang 935.

Fastener 920 includes head 925, a threaded length, and a point at the opposite end of fastener 920 from head 925. As with fastener 320 of FIGS. 3A-3B and fastener 520 of FIGS. 5A-5B, head 925 can be any convenient type for hand operation or hand tool operation. Fastener 920 further includes a location at which snap ring washer 945 may be secured, such as non-threaded or unthreaded portion 940. In various embodiments, snap ring washer 945 may be used in conjunction with or as an alternative to non-threaded or unthreaded portion 940 of fastener 920, making removal of the fastener easier if desired.

FIG. 9C illustrates a perspective view 975 of bushing 931 and snap ring washer 945 of FIGS. 9A-9B. In the illustrated embodiment, bushing 931 includes guide 932 which may secure bushing 931 within head-end tang 930, and threads 933 for engaging threads on the length of the fastener 920. Snap ring washer 945 snaps on to fastener 920, such as at non-threaded or unthreaded portion 940, to prevent fastener 920 from being pulled through point-end tang 935 when fastener 920 is rotated to expand wire spring clamp 910. In various embodiments, using snap ring washer 945 or the like is an alternative to reducing the size of free-rotation tang 935 used to contain fastener 920. Removal of snap ring washer 945 may allow fastener 920 to be removed from spring clamp 910, for example, to leave spring clamp 910 secured to a hose and fitting, without fastener 920.

Returning to FIGS. 9A-9B, threads on fastener 920 engage with threaded bushing 931 retained within head-end fastener-engaging tang 930. Fastener 920 passes through point-end free-rotation tang 935, which is configured to allow fastener 920 to spin within it. In the illustrated embodiment, snap-ring washer 945 is configured to keep the end of fastener 920 captive so that when fastener 920 is rotated to pull tangs 930 and 935 together, the portion of the fastener 920 beyond free-rotation tang 935 stays outside of free-rotation tang 935, thus holding fastener 920 in a fixed translational relationship with tang 935, notwithstanding that fastener 920 can rotate within free-rotating tang 935. Free-rotation tang 935 and snap-ring washer 945 thus push against fastener 920 to prevent fastener 920 from passing through free-rotation tang 935. This allows force to be transmitted by fastener 920 to tangs 930 and 935, to bring tangs 930 and 935 together by rotating the fastener 920, to increase the potential energy and compressive force stored in loop 915 and to thereby open wire spring clamp 910.

As discussed herein, configuration and operation of wire spring clamp 910 is unlike configuration and operation of a prior art wire clamp and, unlike, a prior art spring clamps, wire spring clamp 910 has a built-in tool to enable its safe and convenient use.

FIGS. 10A-10B illustrate perspective views 1000, 1050 of wire spring clamp 1010 with fastener 1020 threaded into bushing 1031 within head-end tang 1030 in accordance with an embodiment. Schematically, wire spring clamp 1010 is analogous to wire spring clamp 910 of FIGS. 9A-9C, in which fastener 920/1020 is threaded into bushing 931/1031 retained within head-end fastener-engaging tang 930/1030. More generally, it is analogous to wire spring clamp 510 of FIGS. 5A-5C, in which the fastener 520/1020 is threaded into head-end fastener-engaging tang 530/1030 and rotates freely in point-end free-rotation tang 535/1035. In embodiment illustrated in FIGS. 10A and 10B, point-end free-rotation tang 1035 is formed from two vertical sections of wire, which may allow fastener 1020 to optionally be removed. In various embodiments, point-end free-rotation tang 1035 may be shaped as one or more curves, loops, or tabs of various shapes and forms to retain fastener 1020. Spring clamp 1010 further comprises first overlap region 1041 and second overlap region 1042. First tang 1030 is at an end of first overlap region 1041. Second tang 1035 is at an end of second overlap region 1042. When spring clamp 1010 is in its relaxed state, or state with lowest potential energy, the first overlap region 1041 and the second overlap region 1042 overlap with loop region of spring host clamp 1010 from overlap location 1043 to the first tang and the second tang.

When the user rotates fastener 1020 within bushing 1031, free-rotation tang 1035 ("second tang") and fastener-engaging tang 1030 ("first tang") are pulled together; this increases potential energy and compressive force in wire spring clamp 1010 and opens wire spring clamp 1010, such that it can be installed or removed as discussed above. In the illustrated embodiment, in addition to allowing tangs 1030, 1035 to be drawn together to expand the spring force loop, spring clamp 1010 may be overtightened or overdriven, e.g., to secure fastener 1020 against vibration.

FIG. 10C illustrates a perspective view 1075 of an example of fastener 1022 configured for use in wire spring clamp 1010 of FIGS. 10A-10B. Head 1025 of fastener 1022 is a thumb screw or wing screw head designed for operation by a user's fingers without tools. Fastener 1022 may be used in other spring clamps as well; for example, fastener 1022 may be substituted for fasteners 520, 920, or 1220 discussed herein. The length of unthreaded portion 1040 of fastener 1022 may be selected to allow more or less play in spring clamp 1010. For example, a longer unthreaded portion can allow spring clamp 1010 to expand with temperature or to contract around a hose that is becoming compressed with age, without interference from fastener 1020 when spring clamp 1010 is not being installed or removed but is providing compressive force on a hose.

As discussed herein, configuration and operation of wire spring clamp 1010 is unlike configuration and operation of a prior art wire clamp and, unlike, a prior art spring clamps, wire spring clamp 1010 has a built-in tool to enable its safe and convenient use.

FIGS. 11A-11C illustrate wire spring clamp 1110 with fastener 1120 threaded into tang threads made from wire spring loops in point-end tang 1130, with fastener 1120 head end free to rotate in head-end free-rotation tang 1135, in accordance with an embodiment. FIG. 11A illustrates a side elevation view 1100 of wire spring clamp 1110 and fastener 1120. FIG. 11B illustrates a perspective view 1150 of wire spring clamp 1110 and fastener 1120. FIG. 11C illustrates a top view 1175 of wire spring clamp 1110. Similar to spring clamp 310 of FIGS. 3A-3B, spring clamp 1110 forms loop region 1115, which may provide compressive spring force, for example, around a circumference of a hose. Spring clamp 1110 further comprises first overlap region 1141 and second overlap region 1142. First tang 1130 is at an end of first overlap region 1141. Second tang 1135 is at an end of second overlap region 1142. When spring clamp 1110 is in its relaxed state, or state with lowest potential energy, the first overlap region 1141 and the second overlap region 1142 overlap with loop region 1115 from overlap location 1143 to the first tang and the second tang.

Fastener 1120 includes head 1125, a threaded length, and a point at the opposite end of fastener 1120 from head 1125. As with fastener 320 of FIGS. 3A-3B, head 1125 can be any convenient type for hand operation or hand tool operation, and a portion (not illustrated) of the length of fastener 1120 near head 1125 may be an unthreaded shank.

Fastener 1120 passes through head-end free-rotation tang 1135 ("second tang"), which is configured to contain fastener 1120 and to allow fastener 1120 to spin within it. The threads on the length of fastener 1120 engage with point-end fastener-engaging tang 1130 ("first tang"). In the illustrated embodiment, the fastener-engaging tang 1130 is configured to engage the threads on the length of the fastener 1120 by wrapping the material of the fastener-engaging tang 1130 around the space for the fastener 1120 at a pitch that can engage threads of the fastener 1120. In an alternative embodiment, the material of fastener-engaging tang 1130 may be tapped to provide additional threading area to engage the threads of fastener 1120.

As discussed herein, configuration and operation of wire spring clamp 1110 is unlike configuration and operation of a prior art wire clamp and, unlike, a prior art spring clamps, wire spring clamp 1010 has a built-in tool to enable its safe and convenient use.

FIGS. 12A-12B illustrate wire spring clamp 1210 with fastener 1220 threaded into tang threads made from wire spring loops in head-end tang 1230, with fastener 1220 point end free to rotate within point-end free-rotation tang 1235, in accordance with an embodiment. FIG. 12A illustrates a side view 1200 of wire spring clamp 1210 and fastener 1220. FIG. 12B illustrates a perspective view 1250 of wire spring clamp 1210 and fastener 1220. Hose clamp 1210 forms loop region 1215, which may provide compressive spring force, for example, around the circumference of a hose. Spring clamp 1210 further comprises first overlap region 1241 and second overlap region 1242. Tang 1230 is at an end of second overlap region 1242. Tang 1235 is at an end of first overlap region 1241. When spring clamp 1210 is in its relaxed state, or state with lowest potential energy, the first overlap region 1241 and the second overlap region 1242 overlap with loop region 1215 from overlap location 1243 to the first tang and the second tang.

Fastener 1220 includes head 1225, a threaded length, and a point at the opposite end of fastener 1220 from head 1225. As with fastener 320 of FIGS. 3A-3B and fastener 520 of FIGS. 5A-5B, head 1225 can be any convenient type for hand operation or hand tool operation. As with fastener 920 of FIGS. 9A-9B, fastener 1220 further comprises a non-threaded or unthreaded portion 1240 to which snap ring washer 1245 may be secured.

In the illustrated embodiment, head-end fastener-engaging tang 1230 is configured to engage the threads on the length of fastener 1220 by wrapping the material of fastener-engaging tang 1230 around the space for the fastener 1220 at a pitch that can engage threads of the fastener 1220. In an alternative embodiment, the additional material of fastener-engaging tang 1230 is tapped to provide additional threading area to engage the threads of fastener 1220.

Threads on the length of fastener 1220 engage with head-end fastener-engaging tang 1230. Fastener 1220 passes through point-end free-rotation tang 1235 ("fastener retainer"), which is configured to contain fastener 1220 and allow fastener 1220 to spin within it; fastener 1220 is retained by snap ring washer 1245 so that when fastener 1220 is turned to draw tangs 1230 and 1235 together, snap ring washer 1245 pushes against free-rotation tang 1235 and the end of fastener 1220 to prevent fastener 1220 from passing through free-rotation tang 1235. This allows tangs 1230 and 1235 to be brought together by rotating fastener 1220, to transfer force to and increase the potential energy and compressive force of wire spring clamp 1210, and to thereby open loop region 1215.

As discussed herein, configuration and operation of wire spring clamp 1210 is unlike configuration and operation of a prior art wire clamp and, unlike, a prior art spring clamps, wire spring clamp 1210 has a built-in tool to enable its safe and convenient use.

FIGS. 13A-13B illustrate perspective views 1300, 1350 of wire spring clamp 1310 with fastener 1320 threaded into loops in head-end tang 1330 in accordance with an embodiment. Schematically, wire spring clamp 1310 is analogous to wire spring clamp 1210 of FIGS. 12A-12B, in which fastener 1220/1320 is threaded into material of the fastener-engaging or head-end tang 1230/1330. More generally, it is analogous to wire spring clamp 510 of FIGS. 5A-5C, in which fastener 520/1320 is threaded into head-end fastener-engaging tang 530/1330 and rotates freely in point-end free-rotation tang 535/1335. In this example, wire spring clamp 1310 includes turns of wire wrapped around fastener 1320 to form head end fastener-engaging tang 1330. The diameter of the wire material approximately matches the thread pitch of fastener 1320, and the turns in the wire material are tight enough to form a space sized between the minor diameter and the major diameter of fastener 1320 threads. This allows wire spring clamp 1310 to effectively engage fastener 1320 while requiring minimal tooling (e.g., no drilling or tapping) to form wire spring clamp 1310. In various embodiments, fastener 1320 is a coarse threaded machine screw rather than a wood screw as illustrated, to minimize friction and wear on fastener-engaging tang 1330.

Wire spring clamp 1310 further includes free-rotation tang 1335 (which is only illustrated as a rough example) and snap ring washer 1345 around fastener 1320. Operation of the wire spring clamp 1310 is as previously described in this disclosure.

As discussed herein, configuration and operation of wire spring clamp 1310 is unlike configuration and operation of a prior art wire clamp and, unlike, a prior art spring clamps, wire spring clamp 1310 has a built-in tool to enable its safe and convenient use.

Figure 14:
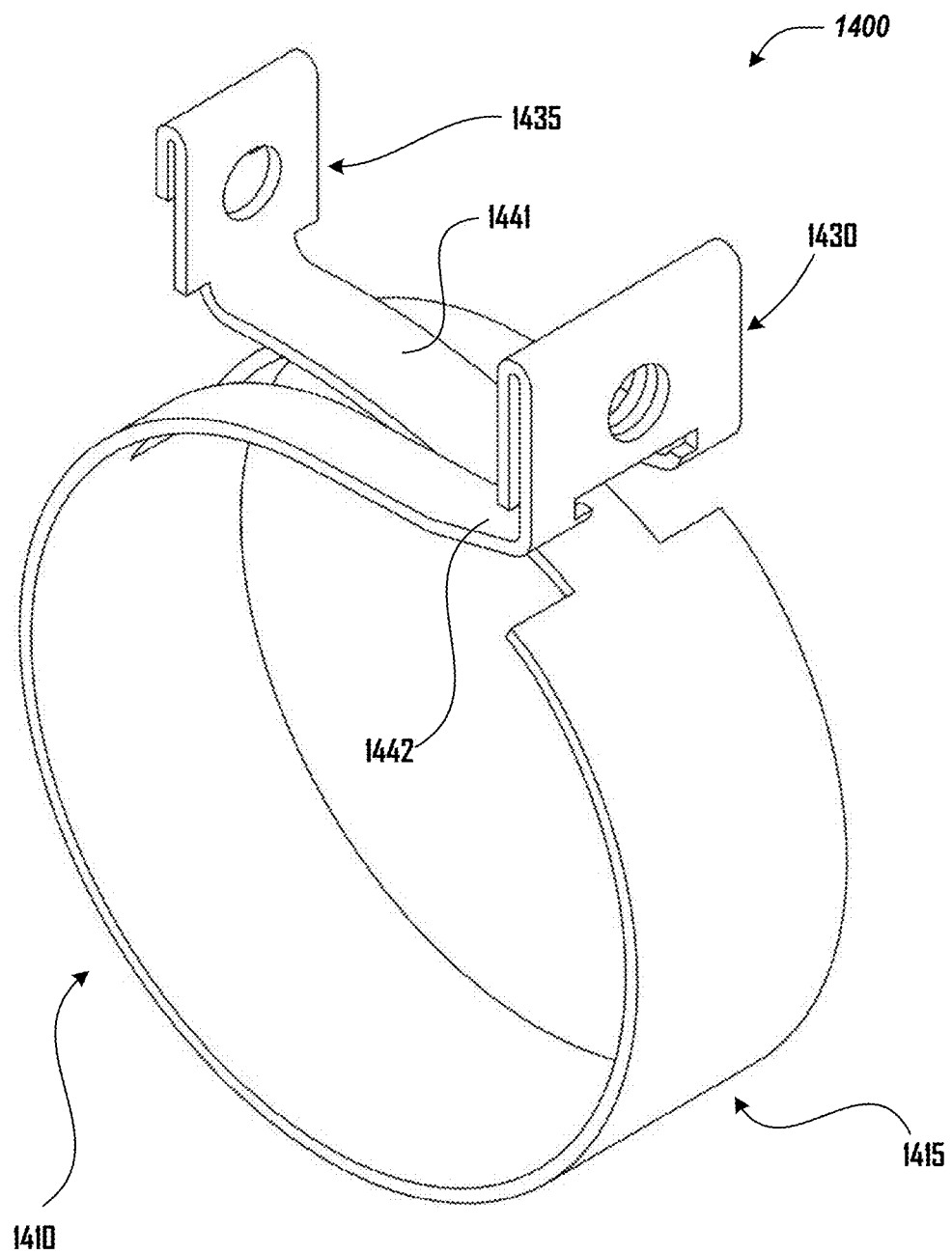
FIG. 14 illustrates a perspective view of a band spring clamp comprising a fastener and tangs to control a potential energy of and to change a diameter of a loop region of the band spring clamp, in accordance with an embodiment.

FIG. 14 illustrates perspective view 1400 of a band spring clamp 1410 with threading for a fastener in head-end tang 1430 in accordance with an embodiment. Schematically, band spring clamp 1410 is analogous to wire spring clamp 510 of FIGS. 5A-5C, in which fastener 520 is threaded into head-end fastener-engaging tang 530/1430 and unthreaded portion 540 of fastener 520 passes through point-end free-rotation tang 535/1435, which is configured to allow fastener 520 to spin within it. In contrast to wire spring clamp 510 of FIGS. 5A-5C, band spring clamp 1410 is constructed of sheet material such as metal, e.g., spring steel. Loop region 1415 provides compressive spring force and is formed by, e.g., bending sheet material into a desired diameter for closed spring clamp 1410, smaller than a diameter of an object to be clamped. Point-end free-rotation tang 1435 passes through a cut-out portion of the band to form first overlap region 1441 and second overlap region 1442, and the two tangs 1430 and 1435 are bent upward to allow a fastener to be inserted through them. The folded double-thickness material of the head-end fastener-engaging tang 1430 may be tapped to engage threads of a fastener.

Figure 15:
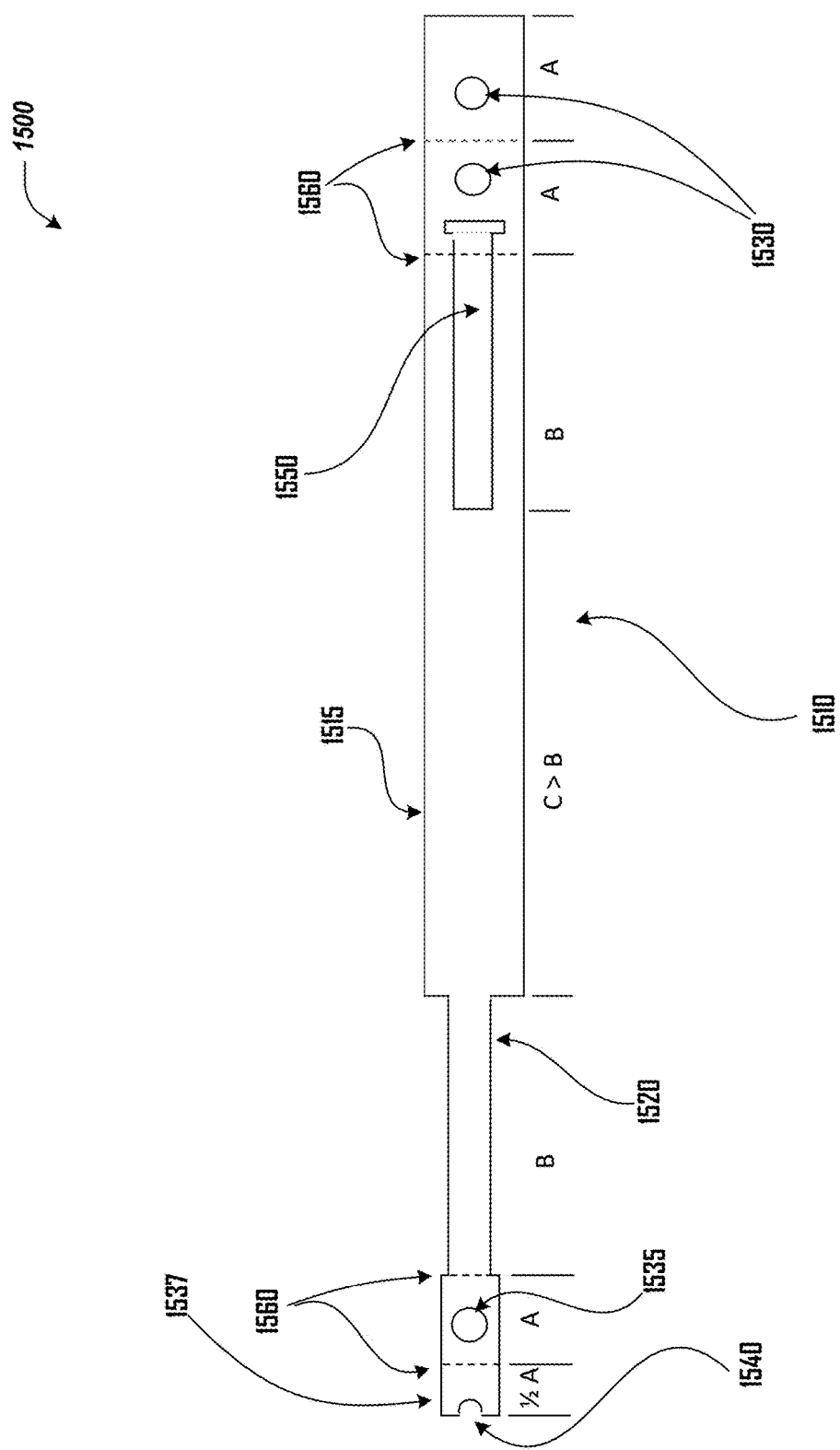
FIG. 15 illustrates a top plan view of a flat band spring before being formed into a spring clamp, in accordance with an embodiment.

FIG. 15 illustrates a top layout or plan view 1500 of flat band spring clamp 1510 showing its construction before being formed into band spring clamp 1410 in accordance with an embodiment. The body of flat band spring clamp 1510 is generally rectangular in shape, acts as the spring of, for example, band spring clamp 1410, and will form loop region 1415 providing spring force in the finished band spring clamp 1410. Narrower portion 1520 has a width (across the narrow dimension of the rectangle) slightly less than the width of a cutout section 1550, so that narrower portion 1520 can pass through cutout section 1550 when loop region 1415, first overlap portion 1441, and second overlap portion 1442 are formed as illustrated in FIG. 14. A T-shaped portion at the end of the cutout section 1550 can accommodate a wider width of the material, which wider width will form free-rotation tang 1435 at the left end of plan view 1500.

Holes 1530 are drilled or cut in the material to allow threads of a fastener to engage fastener-engaging tang 1430 at the right end of plan view 1500. The diameter of holes 1530 is, roughly speaking, greater than the minor diameter of the intended fastener and less than its major diameter once the holes are threaded to engage the fastener. A hole 1535 is similarly drilled or cut to allow the fastener to pass through the free-rotation tang 1435 and rotate smoothly therein. In some embodiments, the diameter of the hole 1535 is thus, like the holes 1530, roughly equal to or slightly greater than the minor diameter of the fastener threads, allowing a fastener to be threaded into or through it until a smaller-diameter unthreaded portion is reached, such as to a position in which locking tab 1537 can engage with the fastener and/or an unthreaded shank portion thereof. In some embodiments, the diameter of the hole 1535 is roughly equal to or slightly greater than the major diameter of the end of the fastener (e.g., an unthreaded end portion) intended to pass through it. In various embodiments, holes 1530 and 1535 may be drilled with the same size drill bit. In some embodiments, holes 1530 may each be tapped. At the end of flat band spring clamp 1510 may be half-hole 1540 having a diameter less than hole 1535. Half-hole 1540 fits into a smaller-diameter unthreaded portion of a fastener, such as the unthreaded portion 540 of the fastener 520 of FIG. 5C. Half-hole 1540 may not be tapped since it may be used to capture the fastener and allow its free rotation. Half-hole 1540 may be used in forming locking tab 1537.

Tang 1430 is folded upward, for example, to ensure that the other tang 1435 does not slip back through the cutout section 1550 once the body of the flat band spring clamp 1510 has been formed into the generally ring-shaped band spring clamp 1410, and to be aligned for the insertion of a fastener between tangs 1430 and 1435. In addition, an end of the tang 1430 is folded over (down) to provide a double thickness which may act as threads for a fastener. The opposite tang 1435 is also folded upward to align with a fastener and accommodating the creation of threads in hole 1535. Half-hole 1540 is not tapped since it may function to capture the fastener and along with hole 1535 allow for free rotation of the fastener. For removal of the fastener once installed, a user only needs to slightly bend locking tab 1537 outward to disengage it and allow for the fastener to be backed out of the holes 1535 and 1530. In an embodiment, tang 1435 may retain a washer, such as snap-ring washer 945; such a washer may further serve to allow the fastener to rotate within tang 1435, without engaging with threads of the fastener.

The lengths ½ A, A, B, and C in plan view 1500 indicate relative lengths used in forming the band spring clamp 1410. Length A corresponds to the height of either tang, length B and C correspond to portions of loop region 1415, and length ½ A corresponds to locking tab 1537 on the free-rotation tang 1435 to retain a fastener. After forming flat band spring clamp 1510, the tangs are folded on fold lines 1560, and a fastener may be inserted, with locking tab 1537 folded down last behind an end portion of the fastener to operate the finished band spring clamp 1410 as described herein.

Figure 16:
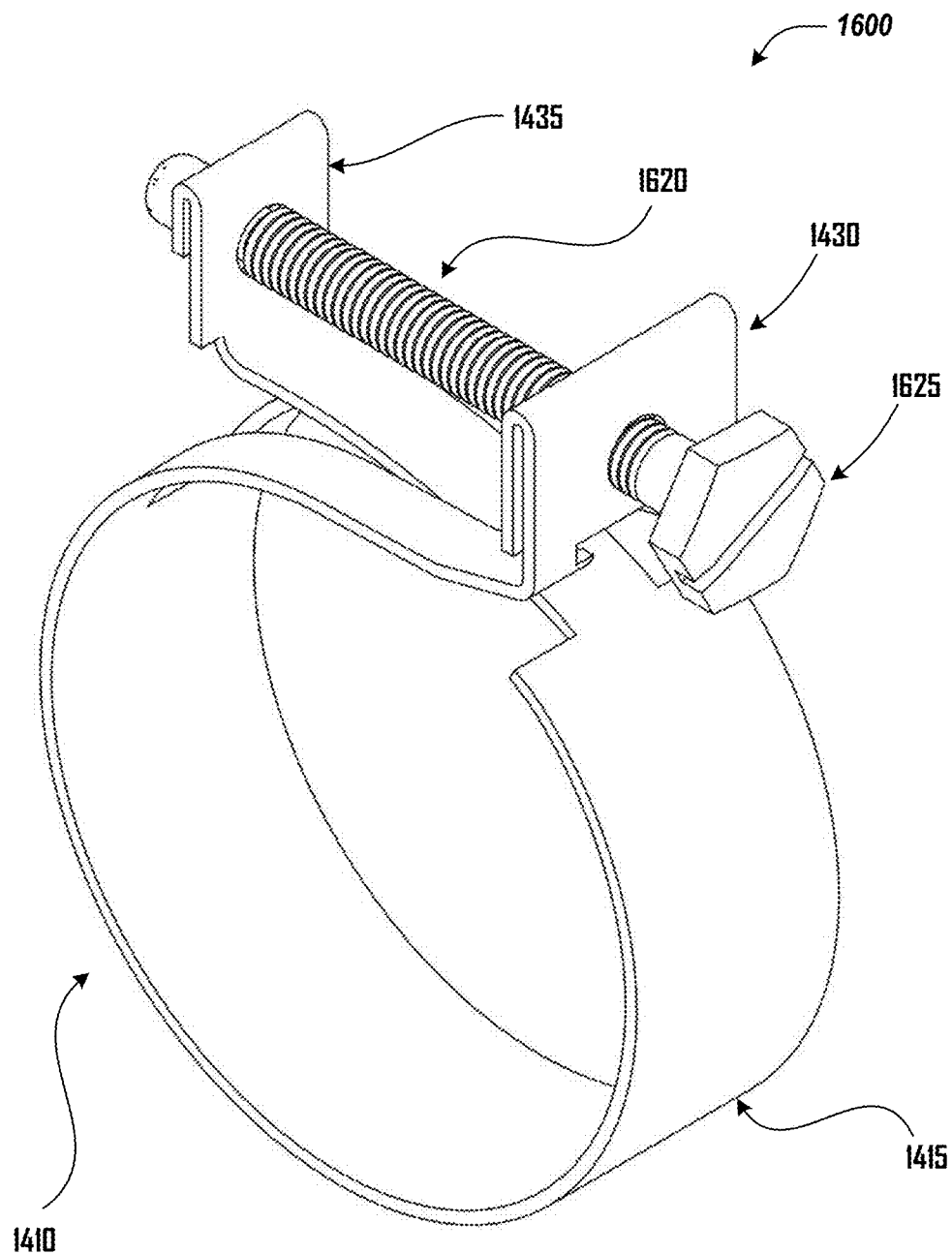
FIG. 16 illustrates a perspective view of the band spring clamp of FIG. 14 with a fastener threaded into a first tang and held by a second tang, in accordance with an embodiment.

FIG. 16 illustrates a perspective view 1600 of band spring clamp 1410 of FIG. 14 with fastener 1620 threaded into head-end fastener-engaging tang 1430 and rotating smoothly in point-end free-rotation tang 1435. The illustrated fastener 1620 has an unthreaded shank between head 1625 and the threaded length of the fastener 1620. In various applications this may not be desired as it might limit the travel of the head-end fastener-engaging tang 1430 along fastener 1620 and decrease the available range to allow hose clamp 1410 to compress around a hose or to overtighten hose clamp 1410 around a hose.

FIGS. 17A-17D illustrate side, top, front, and back views 1700 of band spring clamp 1410 of FIG. 16 and fastener 1720. Unlike fastener 1620 of FIG. 16, fastener 1720 is threaded up to head 1725. The additional threading may be used, for example, to drive the point end 1750 of fastener 1720 through hole 1535 and locking tab 1537. When threads of fastener 1720 clear locking tab 1537, locking tab 1537 snaps into fastener 1720 and may lock fastener 1720 in place (in a fixed translational relationship with tang 1435). FIG. 17A side view shows unthreaded portion 1740 of fastener 1720 near point end 1750 of fastener 1720. In some embodiments, unthreaded portion 1740 of fastener 1720 has a greater length to allow a wider unrestricted range of movement of band spring clamp 1410 (e.g., to compress further around a hose that is settling or breaking down and decreasing in diameter, or, e.g., to accommodate expansion or contraction with changes in temperature). Locking tab 1537 of point end free-rotation tang 1435 sits behind point end 1750 of fastener 1720 to prevent point end 1750 of fastener 1720 from being pulled through point end free-rotation tang 1435 when fastener 1720 is rotated to drive tangs 1430, 1435 together, to increase potential energy of band spring clamp 1410, and to widen loop region 1415. Point end 1750 of fastener 1720 has a diameter that is greater than unthreaded portion 1740 to allow locking tab 1537 to press against it, and that is smaller than the major diameter of the threaded portion of fastener 1720 to allow point end 1750 of fastener 1720 to pass through free-rotation tang 1435 before locking tab 1537 is folded down to lock in fastener 1720. Band spring clamp 1410 further comprises first overlap region 1441 and second overlap region 1442. Tang 1430 is at an end of second overlap region 1442. Tang 1435 is at an end of first overlap region 1441. When band spring clamp 1410 is in its relaxed state, or state with lowest potential energy, the first overlap region 1441 and the second overlap region 1442 overlap with loop region 1415 from overlap location 1743 to the first tang and the second tang.

In some embodiments, locking tab 1537 can be folded up to allow fastener 1720 to be removed and reinserted. In some embodiments, locking tab 1537 is replaced by a cap nut or other end fitting secured at the end of fastener 1720, where fastener 1720 is threaded to its end and the cap nut or other end fitting is larger than hole 1435 and therefore locks the assembled fastener 1720 into the completed band spring clamp 1410.

As discussed herein, configuration and operation of band spring clamp 1410 is unlike configuration and operation of a prior art wire clamp and, unlike, a prior art spring clamps, band spring clamp 1410 has a built-in tool to enable its safe and convenient use.

Figure 17:
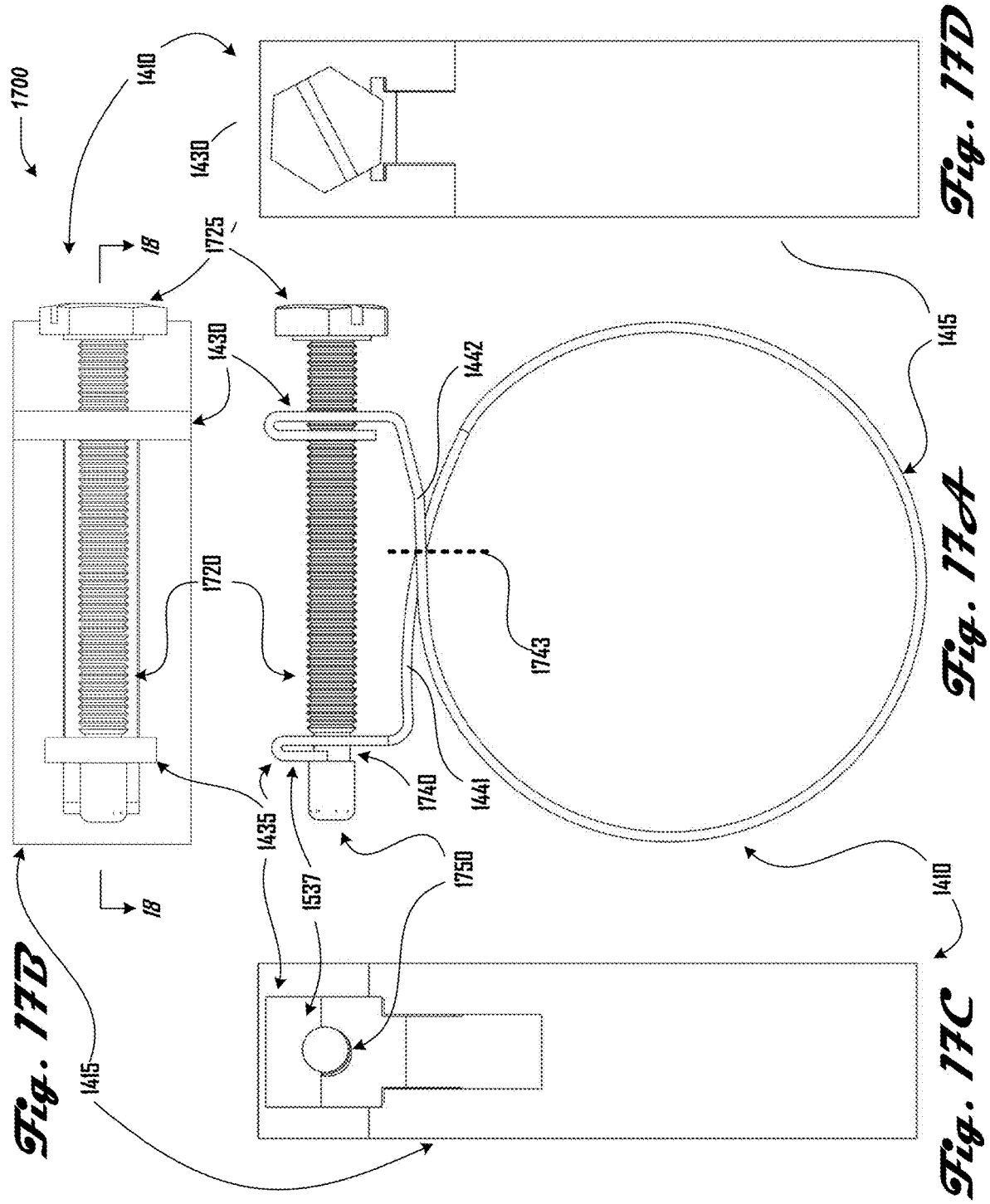
FIGS. 17A-17D illustrate front, side, back and top views of the band spring clamp of FIG. 16, in accordance with an embodiment.
Figure 18:
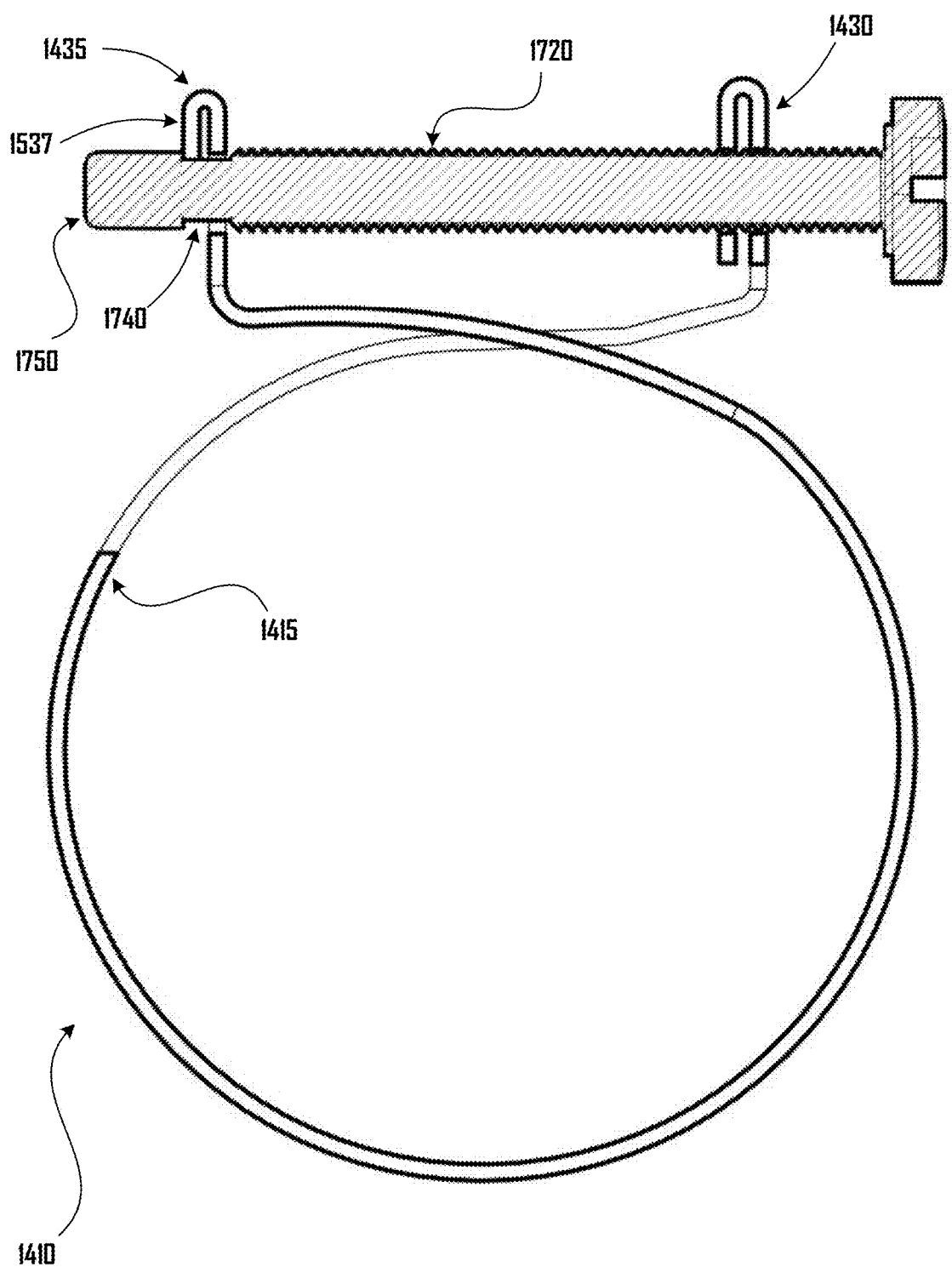
FIG. 18 illustrates a cutaway sectional side view of the band spring clamp of FIG. 16, along line 18-18 in FIG. 17B, in accordance with an embodiment.
Figure 19:
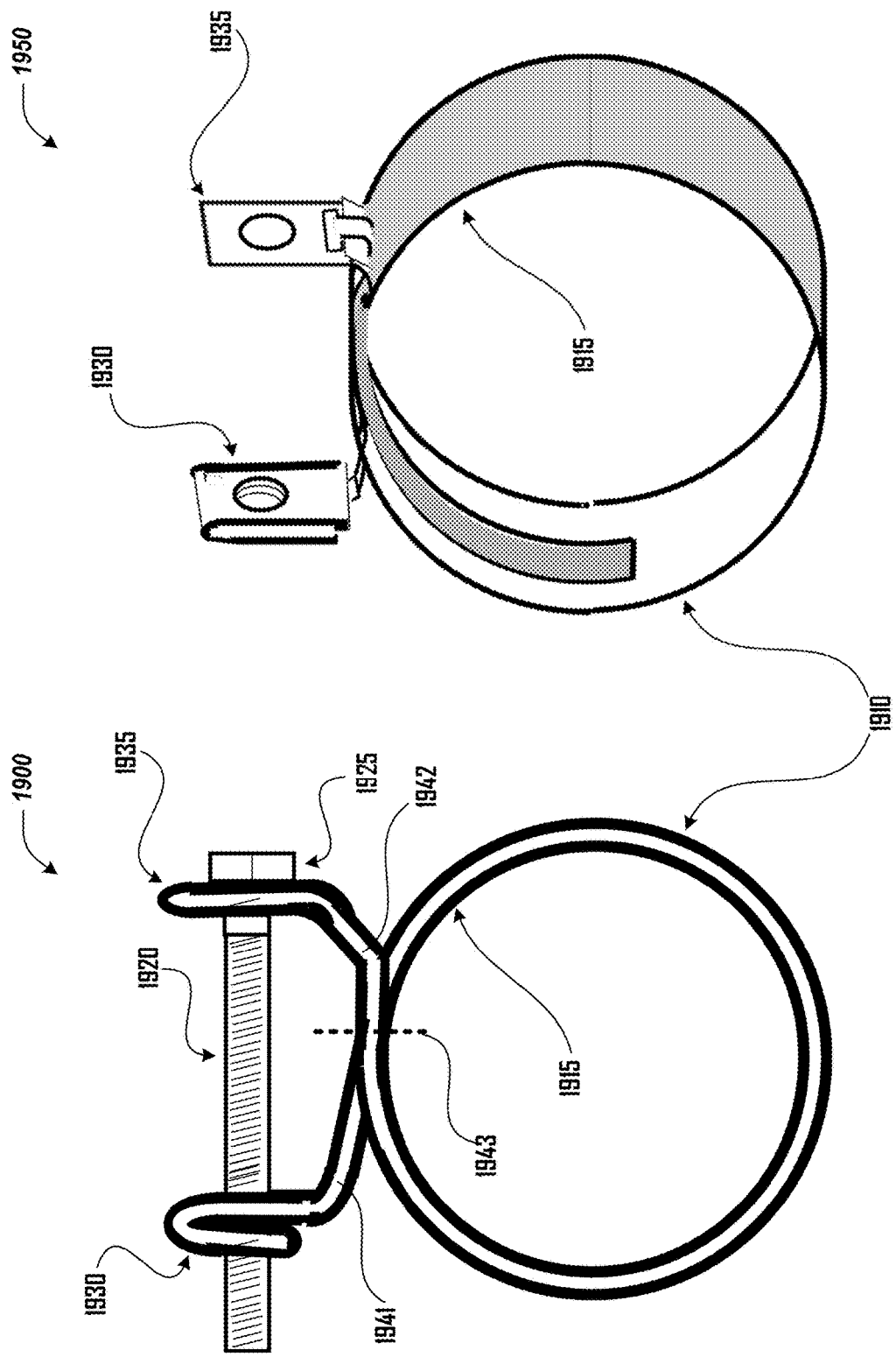
FIGS. 19A-19B illustrate a band spring clamp comprising a fastener and tangs to control a potential energy of and to change a diameter of a loop region of the band spring clamp, in accordance with an embodiment.

FIG. 18 illustrates a cutaway side view 1800 of the band spring clamp of FIGS. 16 and 17, along the line 18-18 in the FIG. 17B top view. This view 1800 shows interaction of the locking tab 1537, unthreaded portion 1740 of fastener 1720, and point end 1750 of the fastener 1720 to retain fastener 1720 within band spring clamp 1410 when tangs 1430 and 1435 are driven toward each other to install or remove band spring clamp 1410.

As discussed herein, configuration and operation of band spring clamp 1410 is unlike configuration and operation of a prior art wire clamp and, unlike, a prior art spring clamps, band spring clamp 1410 has a built-in tool to enable its safe and convenient use.

FIGS. 19A-19B illustrate band spring clamp 1910 with fastener 1920 threaded into point-end tang 1930 and fastener 1920 head 1925 free to rotate within head-end tang 1935, in accordance with an embodiment. Schematically, band spring clamp 1910 is analogous to the wire spring clamp 310 of FIGS. 3A-3B, in which the fastener 320/1920 is threaded into the point-end fastener-engaging tang 330/1930 and rotates freely in the head-end free-rotation tang 335/1935. In contrast to wire spring clamp 310 of FIGS. 3A-3B, band spring clamp 1910 (like the band spring clamp 1410 of FIG. 14) may be constructed of sheet material such as metal, e.g., spring steel.

FIG. 19A illustrates a side view 1900 of band spring clamp 1910 and fastener 1920. Band spring clamp 1910 further comprises first overlap region 1941 and second overlap region 1942. Tang 1930 is at an end of first overlap region 1941. Tang 1935 is at an end of second overlap region 1942. When spring clamp 1910 is in its relaxed state, or state with lowest potential energy, first overlap region 1941 and second overlap region 1942 overlap with loop region 1915 from overlap location 1943 to the first tang and the second tang. FIG. 19B illustrates a perspective view 1950 of band spring clamp 1910 without fastener 1920. Similar to spring clamp 310 of FIGS. 3A-3B, spring clamp 1910 forms loop region 1915 and band spring clamp 1910 stores potential energy and provides spring force around the circumference of a hose.

Fastener 1920 includes head 1925, a threaded length, and a point at the opposite end of the fastener 1920 from the head 1925. As with fastener 320 of FIGS. 3A-3B, head 1925 can be any convenient type for hand operation or hand tool operation, and a portion of the length of fastener 1920 near the head may be an unthreaded shank Fastener 1920 passes through head-end free-rotation tang 1935, which is configured to allow fastener 1920 to spin within it. The threads on the length of fastener 1920 engage with point-end fastener-engaging tang 1930. In the illustrated embodiment, fastener-engaging tang 1930 is configured to engage the threads on the length of fastener 1920 by folding the material of fastener-engaging tang 1930 to create a portion of additional thickness into which threads may be tapped or which may otherwise engage the threads of fastener 1920. In some embodiments, fastener-engaging tang 1930 may include additional folds of the metal sheet material, or folds in one or more alternative directions, or a bushing (not shown). In some embodiments, a nut such as a jam nut or nylon insert "Nylock" stop nut arranged on the threaded portion of fastener 1920 on the opposite side of head-end free-rotation tang 1935 from head 1925 may allow a user to push the tangs apart to overtighten or overdrive them. For example, this allows a user to secure fastener 1920 against vibrating loose.

As discussed herein, configuration and operation of band spring clamp 1910 is unlike configuration and operation of a prior art wire clamp and, unlike, a prior art spring clamps, band spring clamp 1910 has a built-in tool to enable its safe and convenient use.

Figure 20:
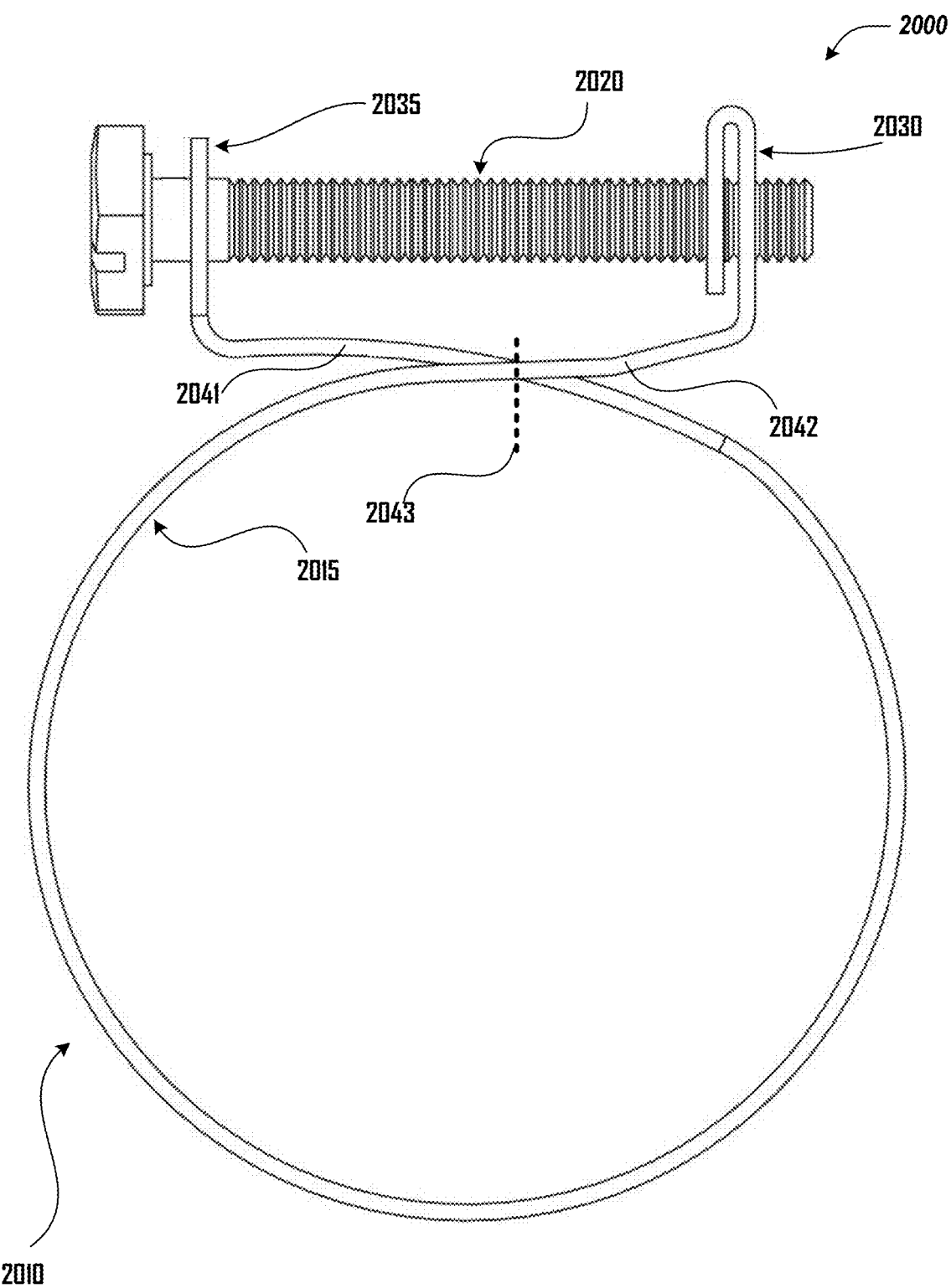
FIG. 20 illustrates a side view of a band spring clamp with a fastener threaded into a first tang and held in a second tang, in accordance with an embodiment.

FIG. 20 illustrates a side view 2000 of band spring clamp 2010 with fastener 2020 passed through head-end free-rotation tang 2035 and threaded into point-end tang 2030 in accordance with an embodiment. Band spring clamp 2010 is analogous to the band spring clamp 1910 of FIGS. 19A-19B. In this example, a hole in head-end free-rotation tang 2035 corresponding to the hole 1535 in FIG. 15 is sized to allow a non-threaded shank or body of the fastener 2020 to rotate smoothly within head-end free-rotation tang 2035. In some embodiments, the holes for fastener 2020 are all drilled and tapped with the same size bit, and a head-end shank of fastener 2020 would have a smaller diameter than the major diameter of the threaded portion of fastener 2020. This allows for installation and removal of fastener 2020 as well as providing free rotation during operation.

Spring clamp 2010 further comprises first overlap region 2041 and second overlap region 2042. Tang 2030 is at an end of second overlap region 342. Tang 2035 is at an end of first overlap region 2041. When spring clamp 2010 is in its relaxed state, or state with lowest potential energy, first overlap region 2041 and the second overlap region 2042 overlap with loop region 2015 from overlap location 2043 to the first tang and the second tang.

As discussed herein, configuration and operation of band spring clamp 2010 is unlike configuration and operation of a prior art wire clamp and, unlike, a prior art spring clamps, band spring clamp 2010 has a built-in tool to enable its safe and convenient use.

FIGS. 21A-21C illustrate wire spring clamp 2110 with fixed fastener 2120 and nut 2142 that can travel along fastener 2120 to compress or release tangs 2135 and 2137, in accordance with an embodiment. FIG. 21A illustrates side view 2100 of wire spring clamp 2110, fastener 2120, and nut 2142. FIG. 21B illustrates a perspective view 2150 of wire spring clamp 2110, fastener 2120, and threaded nut 2142. FIG. 21C illustrates a perspective view 2175 separately showing each of wire spring clamp 2110, fastener 2120, and nut 2142.

Hose clamp 2110 forms spring wire loop region 2115 which may accommodate the circumference of a hose. Fastener 2120 includes head 2125 positioned outside head-end tang 2137, a threaded portion passing through both head-end tang 2137 and point-end tang 2135, and rotatable nut 2142 outside point-end tang 2135. Fastener 2120 is prevented from rotating. In the illustrated embodiment, fastener 2120 is retained by wire spring clamp 2110 and prevented from rotating by spring wire end 2138 that may be shaped to fit into a slot or groove in head 2125 of fastener 2120. Wire end 2138 may be shaped to loop around fastener 2120 head 2125 to form part of head-end tang 2137. The other end of the wire of the wire spring clamp 2110 may be shaped to form some or all of head-end tang 2137 and/or spring wire end 2138 that retains fastener 2120. Neither head-end tang 2137 nor point-end tang 2135 are threaded, which may allow spring clamp 2110 to be manufactured with reduced tooling and at lower cost.

The illustrated mechanism to restrain fastener 2120 with wire 2138, by interlocking with the slot or groove in head 2125 of fastener 2120, is merely one example of many. This disclosure contemplates myriad alternative approaches to prevent the fastener 2120 from rotating, including, e.g., a shaped receptacle in or abutting a tang for a hex, square, or other non-circular head; a friction lock such as by castellation or a lock washer, with or without a lock nut (such as on the other side of head-end tang 2137); use of a winghead bolt or other fastener that does not have clearance to turn; pinning; welding; gluing or epoxying; etc. In embodiments, fastener 2120 may be removable from wire spring clamp 2110.

In the illustrated embodiment, nut 2142 is threaded to accommodate the threads of fixed threaded fastener 2120. The illustrated nut 2142 is a standard manufactured hexagonal nut. Nut 2142 can be replaced by any nut configuration that allows for nut 2142 to be threaded onto fastener 2120, so that nut 2142 can be adjusted using various tools or equipment, or even by hand in the case of, e.g., a wing nut. In some embodiments, nut 2142 can include a mechanism such as a ratchet for selectively engaging or releasing threads, allowing a user to slide nut 2142 along fastener 2120 quickly. Point-end tang 2135 is free to move along fastener 2120 as nut 2142 is turned, so that when nut 2142 is adjusted toward head 2125 of fastener 2120, tangs 2135 and 2137 of wire spring clamp 2110 are squeezed together, increasing potential energy of wire spring clamp 2110 and loosening loop region 2115.

FIGS. 22A-22C illustrate installation onto a hose 420 of wire spring clamp 2110 of FIGS. 21A-21C in accordance with an embodiment. FIGS. 22A and 22B illustrate side views or end views 2200, 2250 of wire spring clamp 2110 (including fastener 2220 and nut 2142) positioned around hose 420 fitted to a pipe, tube, or other fitting 430. FIG. 22A illustrates nut 2142 adjusted along fastener 2120 toward head 2125 of fastener 2120, forcing tangs 2135, 2137 together. FIG. 22B illustrates nut 2142 adjusted along fastener 2120 away from head 2125 of fastener 2120 by tool 2210, allowing tangs 2135, 2137 to spread apart. FIG. 22C is a top view 2275 corresponding to FIG. 22B without tool 2210.

Hose clamp 2110 in FIG. 22A is in an expanded position with the nut 2142 screwed or otherwise adjusted along the threaded portion of fastener 2120 from the point end toward head 2125. Nut 2142 pushes against point-end tang 2135 and pushes it toward head-end tang 2137. This expands the diameter of loop region 2115 of spring clamp 2110 from its relaxed, closed, or lowest potential energy state, and forms a gap between spring clamp 2110 and hose 420. This allows hose 420 to be slid over fitting 430 and allows spring clamp 2110 to be positioned at a desired position and angle around hose 420. Because spring force and potential energy of spring clamp 2110 is held by nut 2142, fastener 2120, and tangs 2135 and 2137, the user does not need to exert continuous force on tangs 2135 and 2137 of spring clamp 2110 to keep spring clamp 2110 open. Indeed, spring clamp 2110 will remain open even, as shown, if no tool is secured to nut 2142 or fastener 2120, until the user turns nut 2142 in the opposite direction to allow the diameter of loop region 2115 to contract and to return to providing spring or compression force around the circumference of hose 420.

FIGS. 22B and 22C show spring clamp 2110 of FIGS. 21A-21C after the user has released the spring force tension held by nut 2142 and fastener 2120 in FIG. 22A. Tool 2210 (in this illustration, a socket driver) adjusts the nut away from head 2125 of fastener 2120 to release the spring force tension, as indicated by turning motion 2215, while fastener 2120 remains fixed within spring clamp 2110 so that it is restrained from rotation. Unscrewing of nut 2142 allows loop region 2115 to contract around the circumference of hose 420 and to provide compressive spring force on hose 420. In comparison to spring clamp 2110 in FIG. 22A, spring clamp 2110 in FIG. 22B is shown closer to its relaxed, closed state, applying pressure to the hose 420 within loop region 2115. Use of nut 2142 along fastener 2120 allows the user to carefully and safely control the application of the spring force of spring clamp 2110 and to hose 420 as loop 2115 returns toward its relaxed diameter, which may be selected to be smaller than the diameter of hose 420.

Accordingly, rotation of nut 2142 allows a user to compress tangs 2135 and 2137 of spring clamp 2110 to enlarge its diameter, or to release them and let tangs 2135 and 2137 move farther apart, decreasing the diameter of spring clamp 2110 and loop region 2115, to enclose and compress, for example, hose 430.

As discussed herein, configuration and operation of wire spring clamp 2110 is unlike configuration and operation of a prior art wire clamp and, unlike, a prior art spring clamps, wire spring clamp 2110 has a built-in tool to enable its safe and convenient use.

FIGS. 23A-23B illustrate wire spring clamps 2310, 2311 in which wire 2319 is formed into fastener 2320 onto which nut 2342 is threaded in accordance with an embodiment. Nut 2342 can travel along fastener 2320, such as by rotation, to compress or release tang 2135 relative to tang 2137 or relative to wire 2319.

FIG. 23A illustrates a side view 2300 of wire spring clamp 2310 and nut 2342. FIG. 23B illustrates a perspective view 2350 of wire spring clamp 2311 and separate nut 2342. The illustrated hose clamps 2310, 2311 each form a spring wire loop region 2315, 2316, which may provide spring force around a circumference of a hose. Spring clamp 2310 of FIG. 23A and spring clamp 2311 of FIG. 23B differ in the arrangement of wires of loop regions 2315 and 2316. In spring clamp 2310, the portions of wire that form point-end tang 2335 are arranged as an inner pair inside the portions of the wire that form head-end tang 2337 and wire 2319 that transitions to become fastener 2320. Fastener 2320 may also be understood as a "tang". In spring clamp 2311, the arrangement is reversed: the portion of wire that forms point-end tang 2335 are arranged as an outer pair outside the portions of wire that form head-end tang 2337 and wire 2319 that transitions to become fastener 2320. This disclosure contemplates various arrangements including wire loops 2315 and 2316, interleaved wires, odd numbers of looped wires, etc.

In the illustrated embodiments, fastener 2320 is formed from the same wire 2319 that is shaped into spring wire loop 2315 and 2316 and the rest of the wire spring clamp 2310, 2311. In some embodiments, fastener 2320 is formed of a different material that is attached to the end of wire 2319. The securement may be made by various mechanical means, e.g., swaging, screwing, pinning, welding, gluing or epoxying, etc. The illustrated nut 2342 is a standard manufactured wing nut threaded to accommodate the threads of fixed threaded fastener 2320. Nut 2342 can be replaced by any nut configuration that allows for nut 2342 to be threaded onto fastener 2320, so that nut 2342 can be adjusted by hand (as with the illustrated wing nut) or using various tools or equipment. In some embodiments, nut 2342 can include a mechanism such as a ratchet for selectively engaging or releasing threads, allowing a user to slide nut 2342 along fastener 2320 quickly. Point-end tang 2335 may move along fastener 2320 as nut 2342 is adjusted, while head-end tang 2337 is captured by wire 2319, so that when nut 2342 is adjusted toward the wire 2319 "head" of fastener 2320, tangs 2335, 2337 of wire spring clamp 2310, 2311 are squeezed together, increasing the diameter of the wire spring hose loop 2315, 2316 and increasing the potential energy of wire spring clamp 2310, 2311. Reversing the rotation of nut 2342 allows tangs 2335 and 2337 to move farther apart, decreasing the loop region 2315, 2316, and allowing spring clamp 2310, 2311 to tighten around a hose.

As discussed herein, configuration and operation of wire spring clamp 2310 and wire spring clamp 2311 is unlike configuration and operation of a prior art wire clamp and, unlike, a prior art spring clamps, wire spring clamp 2310 and wire spring clamp 2311 have built-in tools to enable its safe and convenient use.

FIGS. 24A-24D illustrate band spring clamp 2410 with fixed fastener 2420 and nut 2442 that can travel along fastener 2420 to compress or release tangs 2435 and 2437, in accordance with an embodiment. Schematically, band spring clamp 2410 is analogous to wire spring clamp 2110 of FIGS. 21A-21C, in which head 2125/2425 of fastener 2120/2420 is prevented from rotating by an end 2138/2438; fastener 2120/2420 passes through a pair of tangs 2135, 2137/2435, 2437; and nut 2142/2442 can travel along fastener 2120/2420 to compress or release tangs 2135, 2137/2435, 2437. In contrast to wire spring clamp 2110 of FIGS. 21A-21C, band spring clamp 2410 is constructed of sheet material such as metal, e.g., spring steel.

FIG. 24A illustrates a side view 2400 of band spring clamp 2410, fastener 2420, and nut 2442. FIG. 24B illustrates a perspective view 2450 of band spring clamp 2410, fastener 2420, and threaded nut 2442. FIG. 24C illustrates a perspective view 2475 separately showing each of band spring clamp 2410, fastener 2420, and nut 2442. FIG. 24D illustrates enlarged details of band spring clamp 2410 with fixed fastener 2420 retained by spring band head-end tang 2438, 2439.

The illustrated spring clamp 2410 forms spring band loop region 2415, stores potential energy, and may provide spring force around the circumference of a hose. Fastener 2420 includes head 2425 positioned outside head-end tang 2437, a threaded portion passing through head-end tang 2437 and point-end tang 2435, and rotatable nut 2442 outside point-end tang 2435.

Fastener 2420 is prevented from rotating. A portion of FIG. 24A, marked by the circle labeled 24D, is shown in greater detail in FIG. 24D. FIG. 24D illustrates a retention system for head 2425 of fastener 2420. In the illustrated embodiment, fastener 2420 is retained by head-end retention tab 2439 and prevented from rotating by a pair of side tabs 2438 that engage the flat facets of the hexagonal head 2425 of fastener 2420. The illustrated mechanism of restraining fastener 2420 using one or more side tabs 2438 of band spring clamp 2410 that fit against facets on the side of head 2425 of fastener 2420 is merely one example of many. This disclosure contemplates myriad alternative approaches to prevent fastener 2420 from rotating, including, e.g., a shaped receptacle (such as a close-fitting hole in tab 2439) for a hex, square, or other non-circular head; a friction lock such as by castellation or a lock washer, with or without a lock nut (such as on the other side of head-end tang 2437); use of a winghead bolt or other fastener that does not have clearance to turn; pinning; welding; gluing or epoxying; etc. In some embodiments, fastener 2420 is removable from band spring clamp 2410. For example, head-end retention tab of spring clamp 2410 may be bent upward to allow fastener 2410 to be removed; or such a tab may be omitted or replaced with, e.g., a friction fitting.

In the illustrated embodiment, nut 2442 is threaded to accommodate the threads of fixed threaded fastener 2420. The illustrated nut 2442 is a standard manufactured wing nut threaded to accommodate the threads of fixed threaded fastener 2420. Nut 2442 can be replaced by any nut configuration that allows nut 2442 to be threaded onto fastener 2420, so that nut 2442 can be adjusted by hand (as with the illustrated wing nut) or using various tools or equipment. In some embodiments, nut 2442 can include a mechanism such as a ratchet for selectively engaging or releasing threads, allowing a user to slide nut 2442 along fastener 2420 quickly. Point-end tang 2435 is free to move along fastener 2420 as nut 2442 is adjusted, while head-end tang 2437 is fixed at head 2425 of fastener 2420, so that when nut 2442 is adjusted toward fastener 2420 head 2425, tangs 2435, 2437 of band spring clamp 2410 are squeezed together, increasing the diameter and potential energy of band spring hose loop 2415. Reversing the rotation of the nut 2442 allows the tangs 2435, 2437 to move farther apart, decreasing the diameter of loop region 2315, decreasing potential energy of band spring clamp 2410, and tightening band spring clamp 2410 around a hose.

As discussed herein, configuration and operation of spring clamp 2410 is unlike configuration and operation of a prior art wire clamp and, unlike, a prior art spring clamps, spring clamp 2410 has built-in tools to enable its safe and convenient use.

Figure 25:
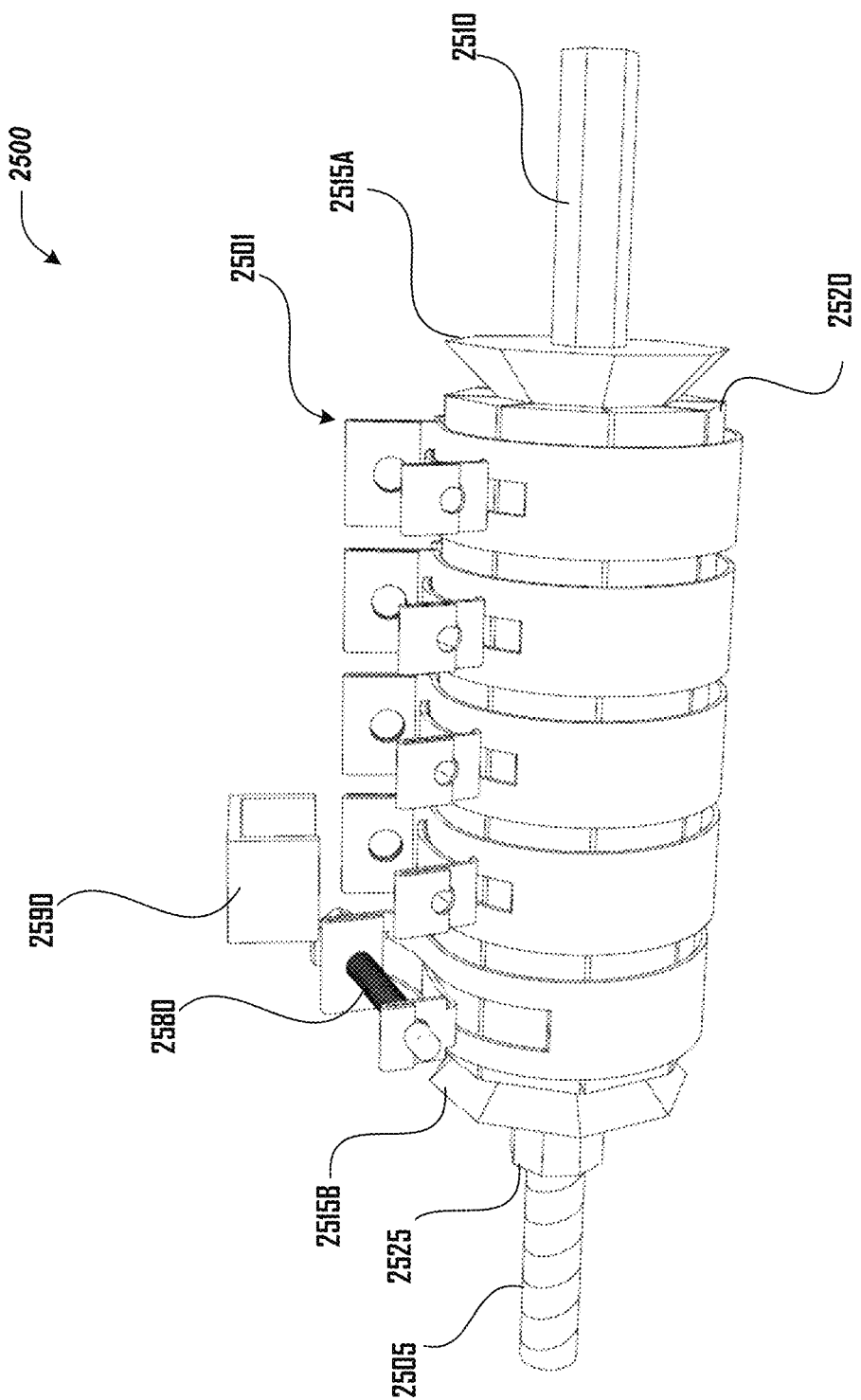
FIG. 25 illustrates an example of a tool to expand one or more spring clamps, in accordance with an embodiment.

FIG. 25 illustrates an embodiment of a tool 2500 to expand one or more spring clamps 2501. The illustrated spring clamps 2501 are band clamps, similar to band spring clamp 1410, though may be any spring clamp.

Tool 2500 comprises a center rod, comprising handle 2510 and threaded portion 2505. Tool 2500 further comprises anvils 2515A and 2515B. Anvil 2515A may be fixed in its location on handle 2510. Anvil 2515B may slide back and forth on center rod, such as along handle 2510. Anvil 2515B may be propelled down center rod by nut 2525. Tool 2500 further comprises expansion plates 2520. One or more retaining elastic rings (not illustrated) may be present around expansion plates 2520, to retain expansion plates 2520 when not retained by a spring clamp. When anvil 2515B is pushed toward anvil 2515A, such as by nut 2525, expansion plates 2520 may be pushed outward by anvils 2515A and 2515B, increasing an outer diameter formed by the outmost face of expansion plates 2520.

One or more spring clamps may be stacked along tool 2500 in a state of lowest potential energy and with a first internal diameter. Nut 2525 may then be screwed toward handle 2510, driving anvil 2515B toward anvil 2515A, expanding the outer diameter of the outmost faces of expansion plates 2520, increasing potential energy of spring clamps 2501, and increasing the first internal diameter to a diameter larger than the first internal diameter. In this state, with increased potential energy and increased internal diameter, spring clamps 2501 may be held in this state by, for example, holding the tangs of spring clamps 2501 together. Tangs of spring clamps 2501 may be held together by, for example, fasteners threaded into tangs (as discussed herein in relation to the disclosed spring clamps) and/or by a "U" shaped structure which spans the tangs and holds them together. For example, fastener 2580 has been threaded into one of spring clamps 2501 to hold it in an expanded, higher potential energy, configuration. For example, clip 2590 above another of spring clamps 2501, may be lowered onto the spring clamp to hold it in an expanded, higher potential energy, configuration.

In the state with higher potential energy and larger internal diameter, spring clamps 2501 may be removed from tool 2500. After removal from tool 2500, spring clamps 2501 may be installed on, for example, a hose, as discussed herein, may be stored, or may otherwise be handled.

Figure 26B:
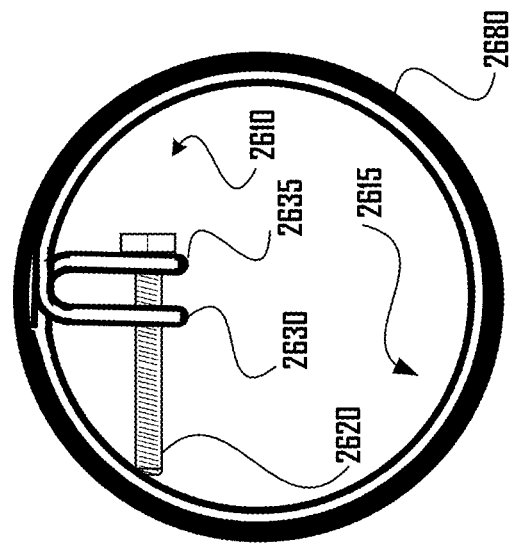
FIGS. 26A-26B illustrate a wire spring clamp comprising a fastener and tangs to control a potential energy of and to change a diameter of a loop region of the wire spring clamp, in accordance with an embodiment.
Figure 26A:
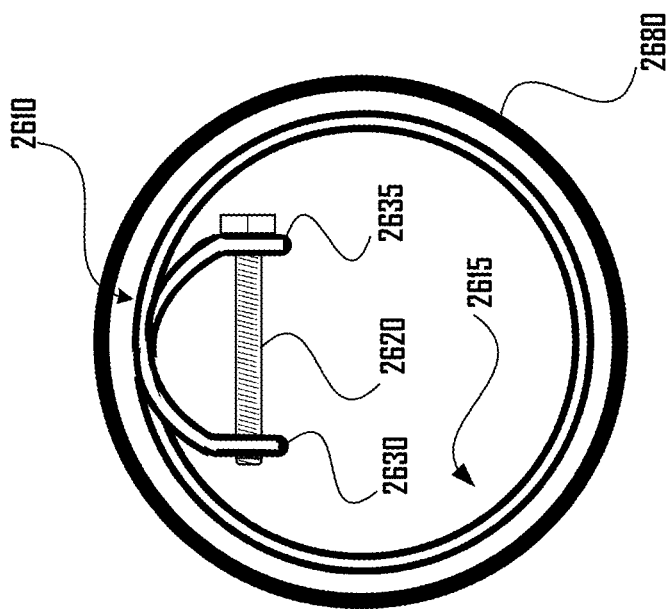

FIGS. 26A-26B illustrate an embodiment of wire spring clamp 2610, with "inverted" tangs and operation. In FIG. 26A, tang 2630 and tang 2635 have been driven apart by fastener 2620; e.g. tang 2635 may be a "fastener retainer", while tang 2630 may be threaded. When tang 2630 and tang 2635 have been driven apart, a diameter of loop region 2615 contracts and potential energy in the spring of wire spring clamp 2610 increases relative to a state with lower potential energy and in which the diameter of loop region 2615 is larger. In this state, and as illustrated in FIG. 26A, wire spring clamp 2610 may be positioned inside of structure 2680. In FIG. 26B, fastener 2620 has been rotated to allow the spring of wire spring clamp 2610 to release potential energy and to allow tang 2630 and tang 2635 to come close together. In this state, wire spring clamp 2610 has lower potential energy than as illustrated in FIG. 26A, though it has not yet reached its relaxed state or state of lowest potential energy. As illustrated in FIG. 26B, wire spring clamp 2610 contacts structure 2680 and it remaining potential energy provides outward compressive force, against an interior wall of structure 2680. Structure 2680 may be a variety of structures, such as a hose, a pipe, a tube, a hull of a vehicle, such as of an aircraft, a watercraft, or a spacecraft, or the like. Tang 2630 and tang 2635 are at the ends of overlap regions present within loop region 2615.

Following are non-limiting examples:

Example 1

A spring clamp comprising: a spring and a fastener; wherein the spring comprises a loop region, a first overlap region, a second overlap region, a first tang at an end of the first overlap region, a second tang at an end of the second overlap region; wherein the spring comprises a state with a lowest potential energy and wherein the loop region has a first diameter in the state with the lowest potential energy; wherein the fastener engages with the first tang and the second tang to control a potential energy of the spring clamp and to change the diameter of the loop region and wherein in an energy state above the state with lowest potential energy, the loop region has a second diameter, wherein the second diameter is larger than the first diameter.

Example 2

The spring clamp according to example 1, wherein the fastener rotates to engage with the first tang and the second tang and transfers a kinetic energy to or from the fastener to control the potential energy of the spring clamp and to change the diameter of the loop region.

Example 3

The spring clamp according to example 1, wherein the second diameter of the loop region loosely accommodates a hose.

Example 4

The spring clamp according to example 3, wherein the fastener engages with the first tang and the second tang to release potential energy from the spring clamp, wherein the release of potential energy from the spring clamp reduces the diameter of the loop region, compresses the hose within the loop region, and secures the hose to a fitting, wherein the fitting is within the hose.

Example 5

The spring clamp according to example 4, wherein after the fastener engages with the first tang and the second tang to release potential energy from the spring clamp, the fastener is removed from the spring clamp.

Example 6

The spring clamp according to example 1, wherein the first tang and the second tang engage with the fastener to increase or decrease a distance between the first tang and the second tang to control the potential energy of the spring clamp.

Example 7

The spring clamp according to example 1, wherein the fastener comprises a fastener thread and wherein at least one of the first tang or the second tang engages with the fastener thread as the fastener controls the potential energy of the spring clamp.

Example 8

The spring clamp according to example 7, wherein the first tang engages with the fastener thread and wherein the second tang allows the fastener to rotate within the second tang without engaging with the fastener thread, to increase or decrease a distance between the first tang and the second tang and to thereby control the potential energy of the spring clamp.

Example 9

The spring clamp according to example 8, wherein the second tang allows the fastener to rotate within the second tang without engaging with a fastener thread of the fastener and holds the fastener in a fixed relationship with the second tang while the first tang engages with the fastener thread to increase or decrease the distance between the first tang and the second tang, and to thereby control the potential energy of the spring clamp.

Example 10

The spring clamp according to example 1, wherein the spring, the first tang, and the second tang are formed from a same material.

Example 11

The spring clamp according to example 10, wherein the same material is one of a flat spring metal, a wire spring metal, or a composite.

Example 12

The spring clamp according to example 11, wherein the same material is the wire spring metal and the loop region comprises two overlapping segments of the wire spring metal.

Example 13

The spring clamp according to example 11, wherein the same material is the wire spring metal, wherein the first tang is wound into thread coils, and wherein the thread coils engage with a fastener thread of the fastener to control the potential energy of the spring clamp.

Example 14

The spring clamp according to example 11, wherein the same material is the wire spring metal, wherein the second tang is wound into a fastener retainer, and wherein the fastener retainer allows the fastener to rotate within the second tang without engaging with a fastener thread of the fastener.

Example 15

The spring clamp according to example 11, wherein the same material is the flat spring metal and the flat spring metal comprises a cut-out.

Example 16

The spring clamp according to example 15, wherein the cut-out allows a material of at least one of the first tang or the second tang to pass through the cut-out to form at least one of the first overlap region or the second overlap region.

Example 17

The spring clamp according to example 1, wherein the fastener comprises a first fastener region with a fastener thread and a second unthreaded fastener region.

Example 18

The spring clamp according to example 17, wherein the first fastener region with the fastener thread is of a first fastener diameter and the second unthreaded fastener region is of a second fastener diameter.

Example 19

The spring clamp according to example 18, wherein the first fastener diameter is larger than the second fastener diameter.

Example 20

The spring clamp according to example 19, wherein the first tang comprises a first tang thread, wherein the first tang thread engages with the fastener thread.

Example 21

The spring clamp according to example 19, wherein the second tang engages with the second unthreaded fastener region and allows the fastener to rotate within the second tang without engaging with the fastener thread of the fastener, to increase or decrease a distance between the first tang and the second tang, and to thereby control the potential energy of the spring clamp.

Example 22

The spring clamp according to example 1, wherein one of the first tang or second tang further comprises or engages with a threaded nut.

Example 23

The spring clamp according to example 22, wherein the threaded nut engages with a fastener threading of the fastener to drive the threaded nut along the fastener and wherein the fastener thereby engages with the first tang and the second tang to control a potential energy of the spring clamp and to change the diameter of the loop region.

Example 24

The spring clamp according to example 1, wherein the fastener engages with the first tang and the second tang to control the potential energy of the spring clamp and to change the diameter of the loop region, to limit an uncontrolled release of potential energy by the spring clamp, and to increase a safe utilization of the spring clamp.

Example 25

The spring clamp according to example 1, wherein the diameter is a first diameter and wherein in an energy state above the state with lowest potential energy, the loop region has a second diameter, wherein the second diameter is larger than the first diameter, and wherein spring clamp is stored for future use in the energy state above the state with lowest potential energy.

Example 26

The spring clamp according to example 24, further comprising a retainer clip to hold the first tang and the second tang in a fixed relationship, wherein the fixed relationship is in the energy state above the state with lowest potential energy.

Example 27

The spring clamp according to example 1, wherein the diameter is a first diameter and wherein in an energy state above the state with lowest potential energy, the loop region has a second diameter, wherein the second diameter is smaller than the first diameter.

Example 28

A spring clamp comprising: a spring with a spring constant and a fastener; wherein the spring comprises a loop region, a first overlap region, a second overlap region, a tang at an end of the first overlap region; wherein the spring comprises a state with a lowest potential energy based on the spring constant; wherein the loop region has a diameter in the state with the lowest potential energy; wherein the first overlap region and the second overlap region overlap with the loop region when the spring is in the state with lowest potential energy; wherein the fastener engages with the second overlap region to control a potential energy of the spring clamp and to change the diameter of the loop region.

Example 29

The spring clamp according to example 27, wherein the fastener is a threaded nut, the tang retains the fastener, the tang allows the nut to rotate, and the second overlap region is threaded, and the threaded nut engages with the second overlap region to control a potential energy of the spring clamp and to change the diameter of the loop region.

Example 30

The spring clamp according to example 1, wherein the spring has a spring constant and wherein the state with lowest potential energy is based on the spring constant and establishes a normal distance between the tangs.

Example 31

The spring clamp according to example 1, wherein the first overlap region and the second overlap region overlap with the loop region when the spring is in the state with lowest potential energy.

Example 32

A clamp expansion tool comprising: a shaft, a plurality of expansion plates, and a plurality of anvils, wherein the plurality of anvils are configured to engage with the plurality of expansion plates to change a diameter around a perimeter of the plurality of expansion plates, wherein a circular clamp is to be mounted around the perimeter of the plurality of expansion plates, and wherein the plurality of expansion plates thereby engage with the circular clamp to increase or decrease an internal diameter of the circular clamp.

Example 33

The clamp expansion tool according to example 32, wherein the circular clamp is a spring clamp and the plurality of expansion plates thereby engage with the spring clamp to increase or decrease a potential energy of the spring clamp and the internal diameter of the spring clamp.

Example 34

The clamp expansion tool according to example 32, further comprising a nut, wherein the nut is configured to engage with the shaft and the plurality of anvils to thereby engage with the plurality of expansion plates to change the diameter around the perimeter of the plurality of expansion plates.

Although specific embodiments have been illustrated and described herein, it will be appreciated by those of ordinary skill in the art that alternate and/or equivalent implementations may be substituted for the specific embodiments shown and described without departing from the scope of the present disclosure. For example, although various embodiments are described above in terms of a wire spring clamp or a band spring clamp, in other embodiments the material forming the clamp may take different forms or have different cross-sections. This application is intended to cover any adaptations or variations of the embodiments discussed herein.

What is claimed is:

1. A spring clamp assembly comprising: a spring and a fastener which allows for a spring loop size/diameter adjustment capability; wherein the spring comprises an overlap loop region formed of an elastic material that deflects under the action of an applied load and returns to its original shape when the load is removed; wherein ends of the loop region contains tangs formed on the outside of the loop region of the spring; wherein one tang contains a hole that is either threaded or has a clip with a threaded hole permanently attached over the tang or no threads but includes a separate threaded nut and the other tang contains a hole or groove or clip with the hole permanently attached over the tang and is not threaded; wherein the fastener comprises a threaded rod with a fastener head; wherein loop size/diameter adjustment is accomplished through the routing of the fastener through both tang holes; wherein rotation of the fastener head or threaded nut changes the potential energy of the spring and enables control of the relative distance between the tangs, wherein rotation of fastener or nut causes loading on the spring pulling the tangs together or reversing rotation of the fastener or nut allows reducing of load on the spring and the tangs to separate a further distance apart; wherein the spring comprises an initial state with a zero and lowest potential energy, maximum distance between tangs, a minimum loop region; wherein the fastener or nut is rotated to increases the spring potential energy above the initial state reducing the relative distance between the tangs and increasing the diameter of the loop region.

2. The spring clamp according to claim 1, wherein, when the spring comprises a state with the lowest potential energy, a longest relative distance between tangs and smallest spring loop region exits, wherein rotating the fastener head such as to decrease in tangs' relative distance, enlarges the size/diameter of the spring loop region, and increases the spring's potential energy, such as to allow the spring clamp to be placed over a conduit, pipe, hose, or other structure.

3. The spring clamp according to claim 2, wherein, when the spring is located in a position over a conduit, pip; hose, or other structure with the fastener engaging with the first tang and the second tang; rotating the fastener releases the potential energy from the spring, wherein the release of the potential energy from the spring, increases the distance between the clamp tangs and reduces the spring clamp size/diameter of the loop region, wherein the spring clamp compresses on to the hose within the loop region, securing it over the hose.

4. The spring clamp according to claim 3, wherein continued rotation of the fastener to be removed from the spring clamp as the spring clamp remains clamped to the conduit, pipe, hose, or other structure allows for the fastener to be removed, e.g., far weight saving, from the spring clamp and the spring clamp remains clamped to the conduit, pipe, hose, or other structure due to the compressive force.

5. The spring clamp according to claim 4, wherein to remove the clamp from a hose, the fastener can be re-installed into the tangs; wherein rotation of the fastener in a direction as to decrease the distance between tangs and increase the potential energy of the spring clamp, and increases the size/diameter of the loop region of the spring to the state of separation, allowing for the spring clamp removal from the hose with the fastener holding the tangs in position.

6. The spring clamp according to claim 1, wherein the spring, the first tang, and the second tang are formed from a same material.

7. The spring clamp according to claim 6, wherein the same material is one of a flat spring metal, a wire spring metal, or a composite.

8. The spring clamp according to claim 7, wherein the same material is the wire spring metal and the loop region comprises overlapping segments of the wire spring metal.

9. The spring clamp according to claim 7, wherein the same material is the wire spring metal, wherein the first tang is wound into thread coils, and wherein the thread coils engage with a fastener thread of the fastener to control the potential energy of the spring and the compressive force stored in the loop region.

10. The spring clamp according to claim 7, wherein the same material is the wire spring metal, wherein the second tang is wound into a fastener retainer, and wherein the fastener retainer allows the fastener to rotate within the second tang without engaging with a fastener thread of the fastener.

11. The spring clamp according to claim 7, wherein the same material is the flat spring metal and the flat spring metal comprises a cut-out, wherein the cut-out allows a material of at least one of the first tang or the second tang to pass through the cut-out to form at least one of the first overlap region or the second overlap region.

12. The spring clamp according to claim 1, wherein the fastener comprises a first fastener region with a fastener thread and a second unthreaded fastener region.

13. The spring clamp according to claim 12, wherein the first fastener region with the fastener thread is of a first fastener diameter and the second unthreaded fastener region is of a second fastener diameter.

14. The spring clamp according to claim 13, wherein the first fastener diameter is larger than the second fastener diameter, wherein the first tang comprises a first tang thread, wherein the first tang thread engages with the fastener thread, and wherein the second tang engages with the second unthreaded fastener region and allows the fastener to rotate within the second tang without engaging with the fastener thread of the fastener, to increase or decrease a distance between the first tang and the second tang, and to thereby control the potential energy of the spring and the compressive force stored in the loop region.

15. A spring clamp assembly comprising: a spring and a fastener which allows for a spring loop size/diameter adjustment capability; wherein the spring comprises an overlap loon region formed of an elastic material that deflects under the action of an applied load and returns to its original shape when the load is removed; wherein the ends of the loop region contain tangs formed on the inside of the loop region of the spring; wherein one tang contains a hole that is either threaded or has a clip with a threaded hole permanently attached over the tang or no threads but include a separate threaded nut and the other tang contains a hole or groove or clip with the hole permanently attached over the tang And is not threaded; wherein the fastener is a threaded rod with a fastener head; wherein loop size/diameter adjustment is accomplished through the routing of the fastener through both tang holes; wherein rotation of the fastener head or threaded nut changes the potential energy of the spring and enables control of the relative distance between the tangs, wherein rotation of the fastener or nut pushes the tangs further distance apart from each other causing increased loading on the spring resulting in smaller diameter of the spring or reversing rotation of the fastener or nut allows reducing of load on the spring, reducing distance between the tangs, resulting in a larger diameter of the spring; wherein the spring comprises an initial state with a zero and lowest potential energy, minimum distance between tangs, a maximum loon region; wherein the fastener or nut is rotated to increase the spring potential energy above the initial state increasing the relative distance between the tangs and decreasing the diameter of the loop region such as to allow the spring clamp to provide outward compressive force against an interior wall of a hose, a pipe, a tube and/or a hull of a vehicle.

* * * * *